US008787146B2

(12) United States Patent
Tamaki et al.

(10) Patent No.: US 8,787,146 B2
(45) Date of Patent: Jul. 22, 2014

(54) TIMING ADJUSTMENT METHOD, RECEIVING STATION, AND TRANSMITTING STATION IN WIRELESS COMMUNICATION SYSTEM, AND WIRELESS COMMUNICATION SYSTEM

(75) Inventors: Satoshi Tamaki, Kokubunji (JP); Mikio Kuwahara, Yokohama (JP); Kenzaburo Fujishima, Kokubunji (JP); Pinai Linwong, Tokyo (JP); Katsuhiko Tsunehara, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 523 days.

(21) Appl. No.: 12/867,407

(22) PCT Filed: Feb. 16, 2009

(86) PCT No.: PCT/JP2009/052522
§ 371 (c)(1),
(2), (4) Date: Nov. 5, 2010

(87) PCT Pub. No.: WO2009/122787
PCT Pub. Date: Oct. 8, 2009

(65) Prior Publication Data
US 2011/0038249 A1    Feb. 17, 2011

(30) Foreign Application Priority Data
Mar. 31, 2008    (JP) .................................. 2008-089128

(51) Int. Cl.
*H04W 24/00*    (2009.01)
(52) U.S. Cl.
USPC ........................................................ 370/210

(58) Field of Classification Search
USPC .................................. 370/280, 343, 210, 203
See application file for complete search history.

(56) References Cited

U.S. PATENT DOCUMENTS

| | | | |
|---|---|---|---|
| 5,359,473 A | 10/1994 | Kaniwa et al. | |
| 5,583,853 A * | 12/1996 | Giallorenzi et al. | 370/441 |
| 5,983,113 A * | 11/1999 | Asanuma | 455/506 |
| 6,967,936 B1 | 11/2005 | Laroia et al. | |
| 2003/0147655 A1* | 8/2003 | Shattil | 398/182 |

(Continued)

FOREIGN PATENT DOCUMENTS

| | | |
|---|---|---|
| JP | 4-274045 | 9/1992 |
| JP | 04-274045 | 9/1992 |

(Continued)

OTHER PUBLICATIONS

Japanese Patent Application No. 2010-505441 issued on Jul. 6, 2012.

*Primary Examiner* — Andrew Lai
*Assistant Examiner* — Zhiren Qin
(74) *Attorney, Agent, or Firm* — Antonelli, Terry, Stout & Kraus, LLP.

(57) ABSTRACT

A discontinuous change in a transmission timing in a time domain, which is caused by a transmission timing adjustment processing of an OFDMA uplink or the like, brings about a discontinuous rotation of a signal phase in a frequency domain, resulting in reduced communication quality. A wireless communication system of the present invention allows the signal phase of the frequency domain in a receiving station to be continuous before and after the timing adjustment processings by controlling a signal sequence in a transmission signal after conversion in the time domain in synchronization with the timing adjustment processing.

8 Claims, 15 Drawing Sheets

(56) References Cited

U.S. PATENT DOCUMENTS

| | | | |
|---|---|---|---|
| 2004/0091057 A1* | 5/2004 | Yoshida | 375/260 |
| 2005/0163094 A1* | 7/2005 | Okada et al. | 370/343 |
| 2006/0198472 A1* | 9/2006 | Nakamura et al. | 375/343 |
| 2007/0070879 A1 | 3/2007 | Yoshida et al. | |
| 2008/0008082 A1* | 1/2008 | Ma et al. | 370/203 |
| 2009/0016268 A1* | 1/2009 | Yi et al. | 370/328 |
| 2010/0097922 A1* | 4/2010 | Kowalski | 370/207 |

FOREIGN PATENT DOCUMENTS

| | | |
|---|---|---|
| JP | 2001-257641 | 9/2001 |
| JP | 2004-214960 | 7/2004 |
| JP | 2007-020072 | 1/2007 |
| JP | 2007-96468 | 4/2007 |

* cited by examiner

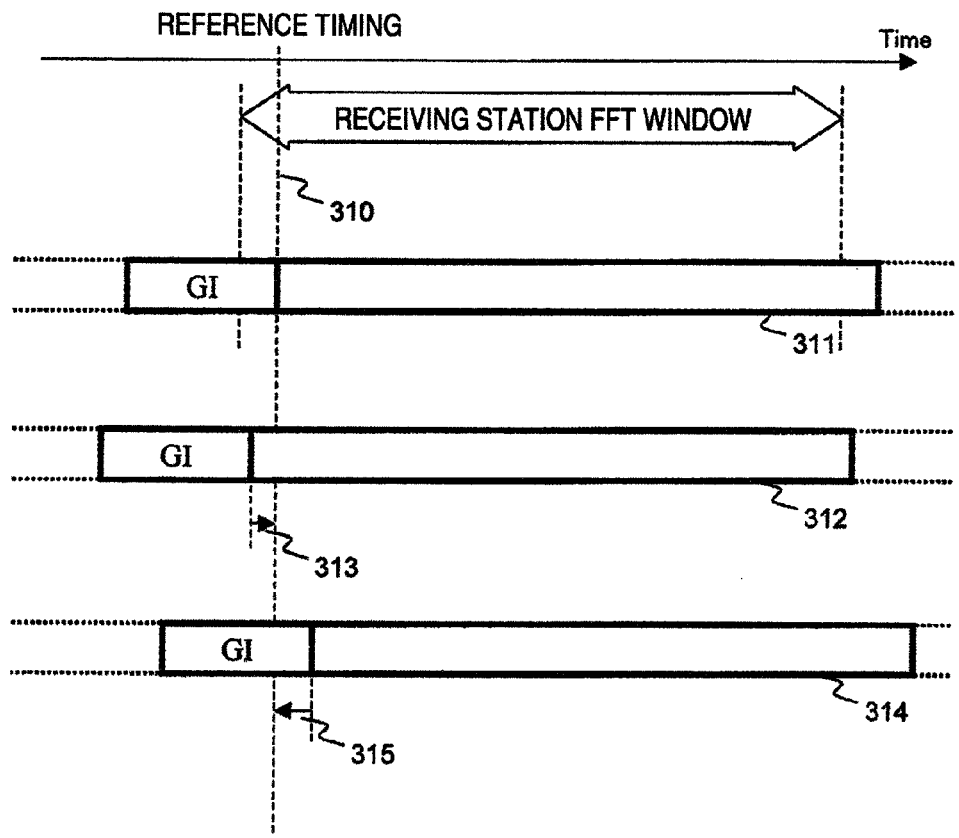
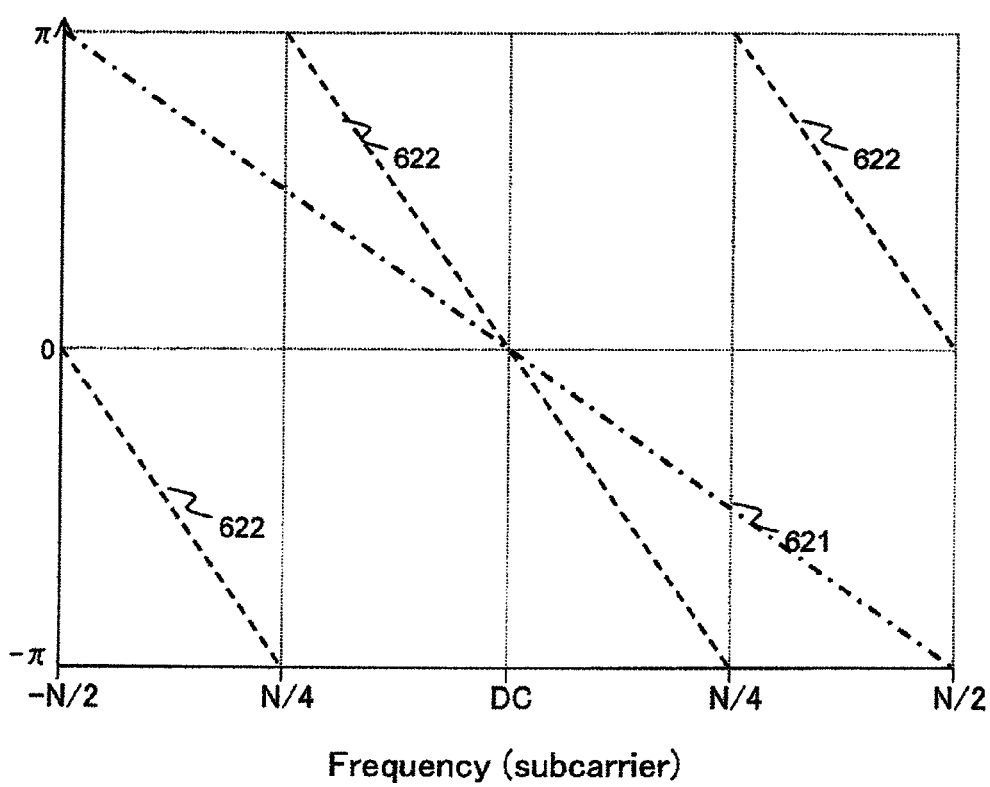

US 8,787,146 B2

TIMING ADJUSTMENT METHOD, RECEIVING STATION, AND TRANSMITTING STATION IN WIRELESS COMMUNICATION SYSTEM, AND WIRELESS COMMUNICATION SYSTEM

INCORPORATION BY REFERENCE

The present application claims priority from Japanese application JP2008-089128 filed on Mar. 31, 2008 the content of which is hereby incorporated by reference into this application.

TECHNICAL FIELD

The present invention relates to a method for adjusting a timing and a radio station for realizing the method in a communication system that synchronizes a transmission signal from a plurality of stations in a receiving end as in a communication from a mobile terminal to a base station of an orthogonal frequency division multiple access.

BACKGROUND ART

With a wider bandwidth of recent wireless communication, as a method capable of efficiently performing communication also in an ever-changing multipath propagation environment in which a plurality of incoming waves are present, there is widely used an OFDM (Orthogonal Frequency Division Multiplexing) for arranging signals in orthogonal frequencies (hereinafter, referred to as a subcarrier) and performing communication using a discrete Fourier transformation as one orthogonal transformation.

At the time of using the OFDM, a fast Fourier transformation (hereinafter, referred to as an FFT) as a fast algorithm of a discrete Fourier transformation and an inverse fast Fourier transformation (hereinafter, referred to as an IFFT) as an inverse transformation thereof are used in general. FIG. 2 is a conceptual diagram illustrating a transformation from a frequency domain to a time domain or from a time domain to a frequency domain of an OFDM symbol using the IFFT and FFT.

The transmitting station first allocates transmission signals to several subcarriers in the frequency domain and generates an OFDM symbol 301 in the frequency domain. The transmitting station substitutes zero into a subcarrier to which a signal is not allocated, and generates an OFDM symbol 302 with a length Td in the time domain using the IFFT. The transmitting station copies the OFDM symbol 304 with a length Tg as a part of the OFDM symbol 302 in the time domain and adds the copied portion to the head of the OFDM symbol 304. This added portion is hereinafter referred to as a guard interval. In addition, the same portion may be referred to a cyclic prefix, and is the same as the guard interval of the present specification.

The receiving station takes out only the OFDM symbol length Td from a reception signal and takes out a signal 308 in the frequency domain using an FFT operation. At this time, a range as a target of the FFT operation is hereinafter referred to as an FFT window. When a position of the FFT window with a length Td is matched with the OFDM symbol in the time domain excluding the guard interval, for example, as in a reference numeral 304, a signal 308 in the frequency domain after the FFT at the time of eliminating an influence of a propagation path is matched with the signal 301 in the frequency domain before the IFFT in the transmission side.

As compared with the above-described case, when the FFT window with a length Td is covered with the guard interval by a length Tlag, for example, as in a reference numeral 305, a phase rotation proportional to the amount of displacement Tlag in the time domain is applied to the signal 308 in the frequency domain after the FFT in addition to an influence of the propagation path. In addition, even if the phase rotation proportional to the amount of displacement Tlag is applied to the signal 308, when the phase rotation is compensated using a reference signal embedded within the OFDM symbol, a signal can be received similarly to a case where the phase rotation is prevented from being applied to the signal 308.

On the other hand, when a position of the FFT window protrudes out of a range of Tg+Td as in reference numerals 306 and 307, since interference from an adjacent OFDM symbol is applied to the FFT operation, degradation is generated in a quality of the reception signal. For this purpose, in the OFDM, a timing control of the FFT window position or transmission and reception of signals is required such that the FFT window falls in the range of Tg+Td. In an uplink of a multiuser system such as an SC-FDMA (Single Carrier-Frequency Division Multiple Access) and an OFDMA (Orthogonal Frequency Division Multiple Access) for receiving signals from a plurality of transmitting stations via one receiving station, the timing adjustment processing is particularly performed as disclosed in, for example, JP-A-2001-257641 "uplink timing synchronization and access control for a multi-access wireless communication system" such that the transmission time of each transmitting station is corrected by an instruction from the receiving station and signals from each transmitting station fall in the range of the FFT window of the receiving station.

FIG. 3 is a conceptual diagram illustrating the timing adjustment processing. In the timing adjustment processing, the FFT window of the receiving station is determined and a signal timing 310 for receiving signals as a reference at a timing of this FFT window is determined. At this time, a reference numeral 311 denotes an example of the reception signal at a reference reception timing. In the timing adjustment processing, when the reception signal is received at a timing advanced from the reference timing, for example, as in a reference numeral 312, the receiving station instructs the transmitting station to transmit signals so as to delay the reception timing by the amount of displacement 313 between the reference reception timing and the reception timing of a reference numeral 312. Also when the reception signal is received at a timing delayed from the reference timing, for example, as in a reference numeral 314, the receiving station similarly instructs the transmitting station to transmit signals so as to advance the reception timing by the amount of displacement 315 between the reference reception timing and the reception timing of a reference numeral 314.

Patent Document 1: JP-A-2001-257641

DISCLOSURE OF THE INVENTION

Problems to be Solved by the Invention

When adjusting a transmission timing of the transmitting station by the above-described timing adjustment processing, a displacement is generated in a relationship between the reception signal and FFT window of the receiving station before and after the timing adjustment processings. A timing displacement in the time domain before the FFT appears as a phase rotation in the frequency domain after the FFT, for example, as illustrated in FIG. 4.

FIG. 4 is a graph illustrating a phase difference between before the timing adjustment processing and after the timing adjustment processing for each subcarrier. The horizontal axis represents the subcarrier number, the vertical axis represents the phase difference for each subcarrier, and N represents the number of units of the FFT. A chain line 621 represents a phase difference between before and after the timing adjustment processings in the case where a signal after the IFFT is displaced by one unit using the timing adjustment processing, and a broken line 622 represents a phase difference in the case where a signal after the IFFT is displaced by two units using the timing adjustment processing. As a subcarrier is more separated from DC or a displacement of the timing is larger, the amount of a phase rotation is more increased, as illustrated in FIG. 4. For example, when the number of units of the FFT is 64 and a subcarrier is separated from DC by 16 subcarriers, even if the timing is displaced by one unit at most, the phase largely rotates at $\pi/2=90$ degrees.

For example, a phase rotation of one signal of a fixed pattern embedded within the OFDM symbol is measured, and a phase rotation of another signal is estimated based on the phase rotation, and a phase rotation in the opposite direction is applied to the signal, thereby compensating this phase rotation. There arises no problem in the case where a signal processing is closed and completed within the OFDM symbol. On the other hand, when estimating the phase rotation, measurement results of a plurality of fixed pattern signals are generally averaged for the purpose of improving estimation accuracy. However, this averaging is made difficult due to the difference between discontinuous signal phases among the OFDM symbols caused by the timing adjustment processing. As a result, the difference causes reduction in a quality for compensating the phase rotation of the reception signals and deterioration in a communication quality.

To solve the above-described problem, it is an object of the present invention to provide a method for adjusting a timing and radio station adopting the method for preventing a discontinuous phase difference causing deterioration in a communication quality from being generated when effectively controlling a transmission signal in the transmitting station, in the wireless communication system using as a base the OFDM such as an OFDMA and SC-FDMA.

Means for Solving the Problems

To solve the above-described objects, a wireless communication system of the present invention controls a signal sequence of a transmission signal after converting a frequency domain into a time domain in synchronization with a timing adjustment processing.

To accomplish the above-described objects, according to one aspect of the present invention, there is provided a wireless communication system. This system includes: a first radio station, the first radio station including: a unit that measures a difference between a reference timing of the first radio station and a reception timing of a signal transmitted from the second radio station; a timing adjustment signal generator that generates a signal including data on the difference; and a transmitter that transmits a signal including data on the difference; and a second radio station, the second radio station including: a signal generator that generates a signal in a time domain using an orthogonal transformation; a timing adjustment signal extraction unit that extracts data on the difference included in a signal including data on the difference transmitted from the first radio station; a transmission timing controller that determines the correction amount of a signal arrangement phase and that of a transmission timing based on the extracted difference data; a phase controller that controls a signal arrangement phase of a signal in the time domain based on the correction amount of the signal arrangement phase; and a timing adjustment unit that controls a transmission timing of a signal in which the signal arrangement phase is controlled based on the correction amount of the transmission timing, wherein a signal is transmitted and received between the first radio station and the second radio station, and wherein using the controlled transmission timing, the second radio station transmits a signal to the first radio station.

To accomplish the above-described objects, according to another aspect of the present invention, there is provided a transmitting station for transmitting and receiving a signal to and from a receiving station through wireless communication. This transmitting station includes: a signal generator that generates a signal in a time domain using an orthogonal transformation; a timing adjustment signal extraction unit that extracts difference data included in a signal including the difference data transmitted from the receiving station; a transmission timing controller that determines the correction amount of a signal arrangement phase and that of a transmission timing based on the extracted difference data; a phase controller that controls a signal arrangement phase of a signal in the time domain based on the correction amount of the signal arrangement phase; and a timing adjustment unit that controls a transmission timing of a signal in which the signal arrangement phase is controlled based on the correction amount of the transmission timing, wherein the transmitting station transmits a signal to the receiving station at the controlled transmission timing.

To accomplish the above-described objects, according to yet another aspect of the present invention, there is provided a receiving station for transmitting and receiving a signal to and from a transmitting station through a wireless communication. This receiving station includes: a unit that measures a difference between a reference timing of the receiving station and a reception timing of a signal transmitted from the transmitting station; a timing adjustment signal generator that generates a signal including the difference data; and a transmitter that transmits a signal including the difference data.

To accomplish the above-described objects, according to yet another aspect of the present invention, there is provided a method for adjusting a timing for synchronizing a reception signal in a wireless communication system for transmitting and receiving a signal between a first radio station and a second radio station. This method includes causing: the first radio station to execute the steps of: measuring a difference between a reference timing of the first radio station and a reception timing of a signal transmitted from the second radio station; generating a signal including the difference data; and transmitting a signal including the difference data, and the second radio station to execute the steps of: generating a signal in a time domain using an orthogonal transformation; extracting difference data included in a signal including the difference data transmitted from the first radio station; determining the correction amount of a signal arrangement phase and that of a transmission timing based on the extracted difference data; controlling a signal arrangement phase of a signal in the time domain based on the correction amount of the signal arrangement phase; and controlling a transmission timing of a signal in which the signal arrangement phase is controlled based on the correction amount of the transmission timing.

Effects of the Invention

The proposed timing adjustment method of the present invention permits the transmitting station to perform rearrangement of a signal sequence according to the amount of adjustment of the timing adjustment processing although the timing adjustment processing is performed in the direction of advance or in the direction of delay. Therefore, in a signal after the FFT of the receiving station, a discontinuous change in a phase due to the timing adjustment processing is suppressed.

FIG. 10 illustrates a graph illustrating an effect of the present invention, and illustrates an example of a time change in a signal phase of a subcarrier in the case where a time required for a signal transfer from a transmitting station to a receiving station increases in proportional to a time passage.

In FIG. 10, a broken line 600 illustrates an example of a time change in a signal phase in the case where the present invention is not applied, and a solid line 610 illustrates an example of a time change in a signal phase in the case where the present invention is applied. In the case where the present invention is not applied, a phase changes discontinuously at the time of performing the timing adjustment processing as in a reference numeral 601 of FIG. 10. Therefore, a temporal average processing is difficult.

As compared with the above-described case, when applying the present invention, the phase does not change discontinuously at the time of performing the timing control. Accordingly, regardless of the presence or absence of the timing adjustment processing, a signal can be averaged. As a result, deterioration in the communication quality due to the timing adjustment processing can be prevented.

Other objects, features and advantages of the invention will become apparent from the following description of the embodiments of the invention taken in conjunction with the accompanying drawings.

BRIEF DESCRIPTION OF THE DRAWINGS

FIG. 3 is a conceptual diagram illustrating a timing adjustment processing;

FIG. 4 is a graph illustrating a phase difference between before a timing adjustment processing and after a timing adjustment processing for each subcarrier;

DESCRIPTION OF REFERENCE NUMERALS

Figure 1:
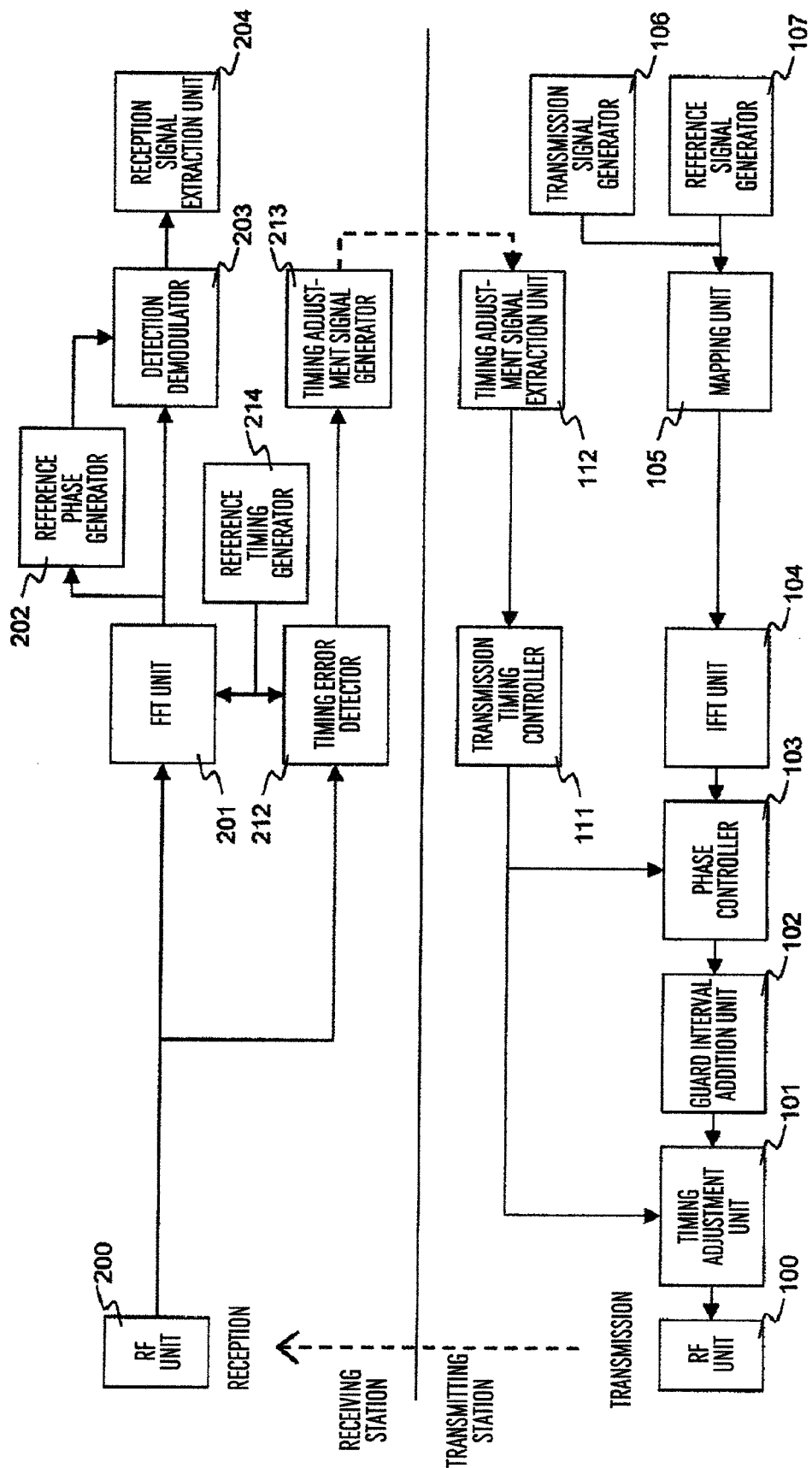
FIG. 1 is a configuration diagram of a transmitting station and a receiving station according to a first embodiment of the present invention.
Figure 2:
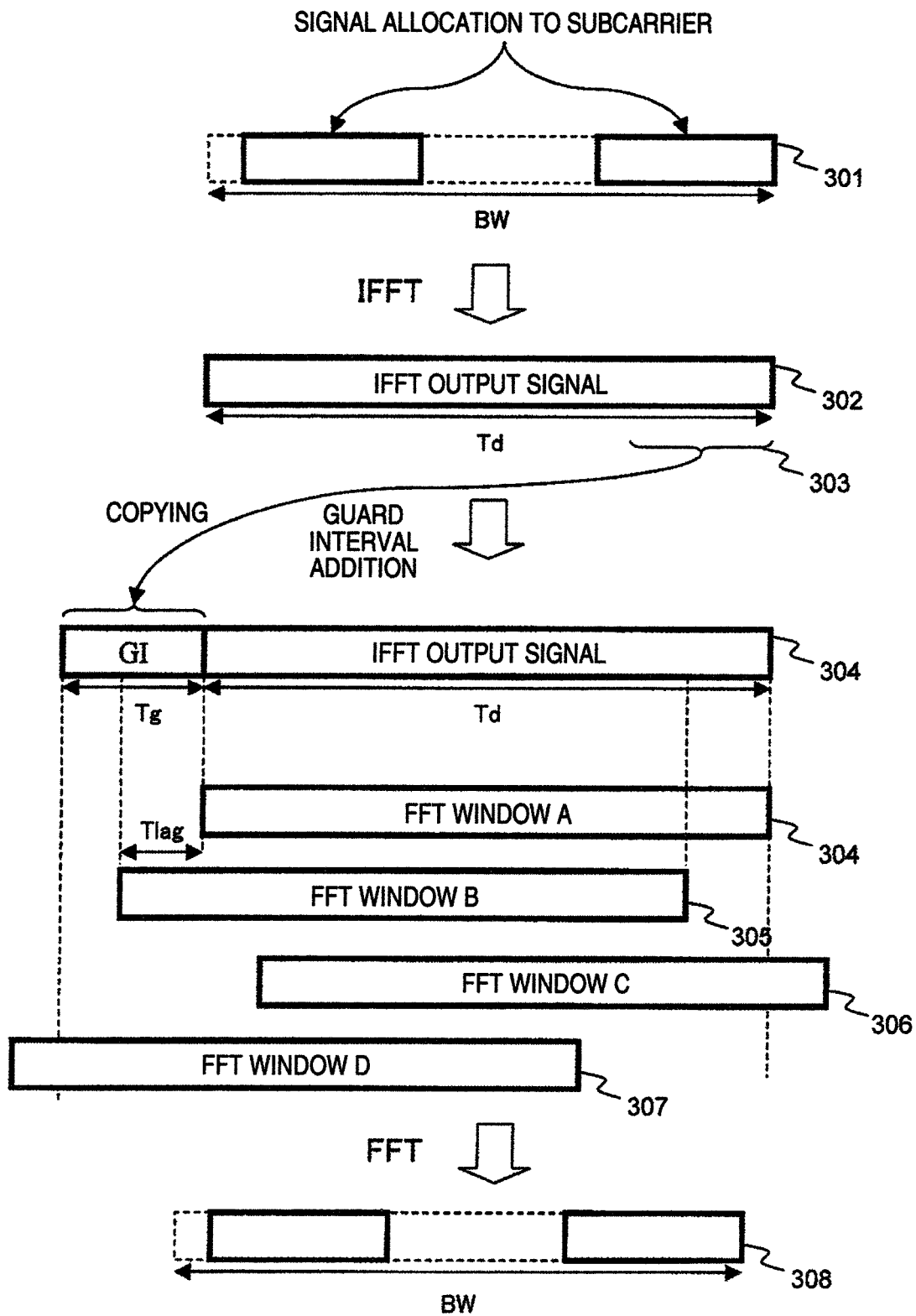
FIG. 2 is a conceptual diagram illustrating a conversion from a frequency domain to a time domain and from a time domain to a frequency domain of an OFDM symbol.

100: transmitting station RF unit
101: timing adjustment unit
102: guard interval addition unit
103: phase controller
104: IFFT unit
105: mapping unit
106: transmission signal generator
107: reference signal generator
108: synchronizing signal generator
109: selector
111: transmission timing controller
112: timing adjustment signal extraction unit
200: receiving station RF unit
201: FFT unit
202: reference phase generator
203: detection demodulator
204: reception signal extraction unit
211: synchronous timing detector
212: timing error detector
213: timing adjustment signal generator
214: reference timing generator
221: transmitting station FFT unit
301: OFDM symbol in a frequency domain
302: OFDM symbol in a time domain
303: a part of an OFDM symbol in a time domain
304: OFDM symbol in a time domain to which a guard interval is added
304, 305, 306, 307: examples of FFT windows
308: signal in a frequency domain after a reception side FFT
310: reference reception timing 311: example of a reception signal at a reference reception timing 312, 314: examples of reception signals displaced from a reference reception timing 313, 315: examples of time differences between a reception timing and a reference timing 321, 322, 323, 324, 331, 332, 333, 341, 342, 343, 344, 351, 352, 353, 361: examples of reception signals 320, 340: examples of the amount of timing adjustment 400: matched filter 401: correlation operation unit 402: delay unit

403: LPF

404: inter-symbol average unit

405: timing detector

406: comparator 600, 601: examples of time change in signal phases in the case where the present invention is not applied 610: example of time change in a signal transfer in the case where the present invention is applied 621: phase difference in each subcarrier between before and after timing adjustment processings of one unit 622: phase difference in each subcarrier between before and after timing adjustment processings of two units 700: subcarrier in which a signal is not mapped 701: transmission signal 702: reference signal 710: OFDM symbol in which a transmission signal and a reference signal are mapped 711: synchronizing signal 750, 751: a part of an input signal to a phase controller 760, 761: a part of an output signal from a phase controller P101, P102, P103, P104: example of a processing of a receiving station P111, P112, P113, P114: example of a processing of a transmitting station

MODE FOR CARRYING OUT THE INVENTION

Hereinafter, preferred embodiments of the present invention will be described with reference to the accompanying drawings of the embodiments. A timing adjustment processing according to the present invention is a processing for adjusting a timing of a signal transmitted by a first radio station and received by a second radio station. On the other hand, in a general wireless communication system, communication is performed in a two-way manner and, for example, a control signal for the timing adjustment processing is required to be transmitted from the second radio station to the first radio station. In this specification, a transmission and reception of signals to be adjusted in the timing adjustment processing is taken notice of, and the first radio station is referred to as a transmitting station and the second radio station is referred to as a receiving station.

In the case of the wireless communication system where a base station and a mobile terminal perform communication, the transmitting station may correspond to the mobile terminal and the receiving station may correspond to the base station. Or alternatively, the transmitting station may correspond to the base station and the receiving station may correspond to the mobile terminal.

In the following embodiment, a signal in a time domain generated by IFFT is referred to as an OFDM symbol. The present invention is not limited to an OFDM of a single user, and further, applicable also to a multi-user multiplexing in which a signal in the time domain is generated by the IFFT such as an OFDMA or SC-FDMA.

Further, in the following embodiment, an orthogonal transformation in the transmitting station is referred to as the IFFT, and an orthogonal transformation in the receiving station is referred to as the FFT. However, an application of the present invention is not limited to a communication system using the above-described transformation. When a displacement of the time in a time domain is a transformation corresponding to a phase rotation in a frequency domain, the present invention can be applied also to a communication system using any transformation.

In the following embodiment, a symbol Td represents an OFDM symbol length excluding a guard interval length, a symbol Tg represents the guard interval length, and a symbol Ts represents an OFDM symbol length to which the guard interval length is added. The fact that a signal arrangement phase is zero represents that signals align in the order corresponding to an output of the IFFT. Further, the fact that the signal arrangement phase is t represents a signal in which a portion of a tail length (t % Tg) of a signal the signal arrangement phase of which is zero is arranged at the head and continuously a portion of a length Tg−(t % Tg) from the head of the signal the signal arrangement phase of which is zero is arranged. Here, a sign % is an operator representing the remainder, and a sign x % y means a value resulting from subtracting from x a product obtained by multiplying x by a maximum integer less than or equal to the quotient obtained by dividing x by y. Based on the above-described definition, a signal with the signal arrangement phase t, a signal with the signal arrangement phase t+Tg, and a signal with the signal arrangement phase t−Tg are matched with each other.

For the purpose of describing embodiments of the present invention concisely, this specification is described as if signals transmitted from the transmitting station are received at a single reception timing in the receiving station. On the other hand, in a real propagation environment, signals transmitted from the transmitting station are generally received as synthesized signals with a plurality of reception timings due to multipath. However, the proposed wireless communication system of the present invention can exert effects with no problem also when being influenced by multipath.

First Embodiment

The timing adjustment processing and the radio station according to a first embodiment of the present invention will be described with reference to the accompanying drawings.

Figure 20:
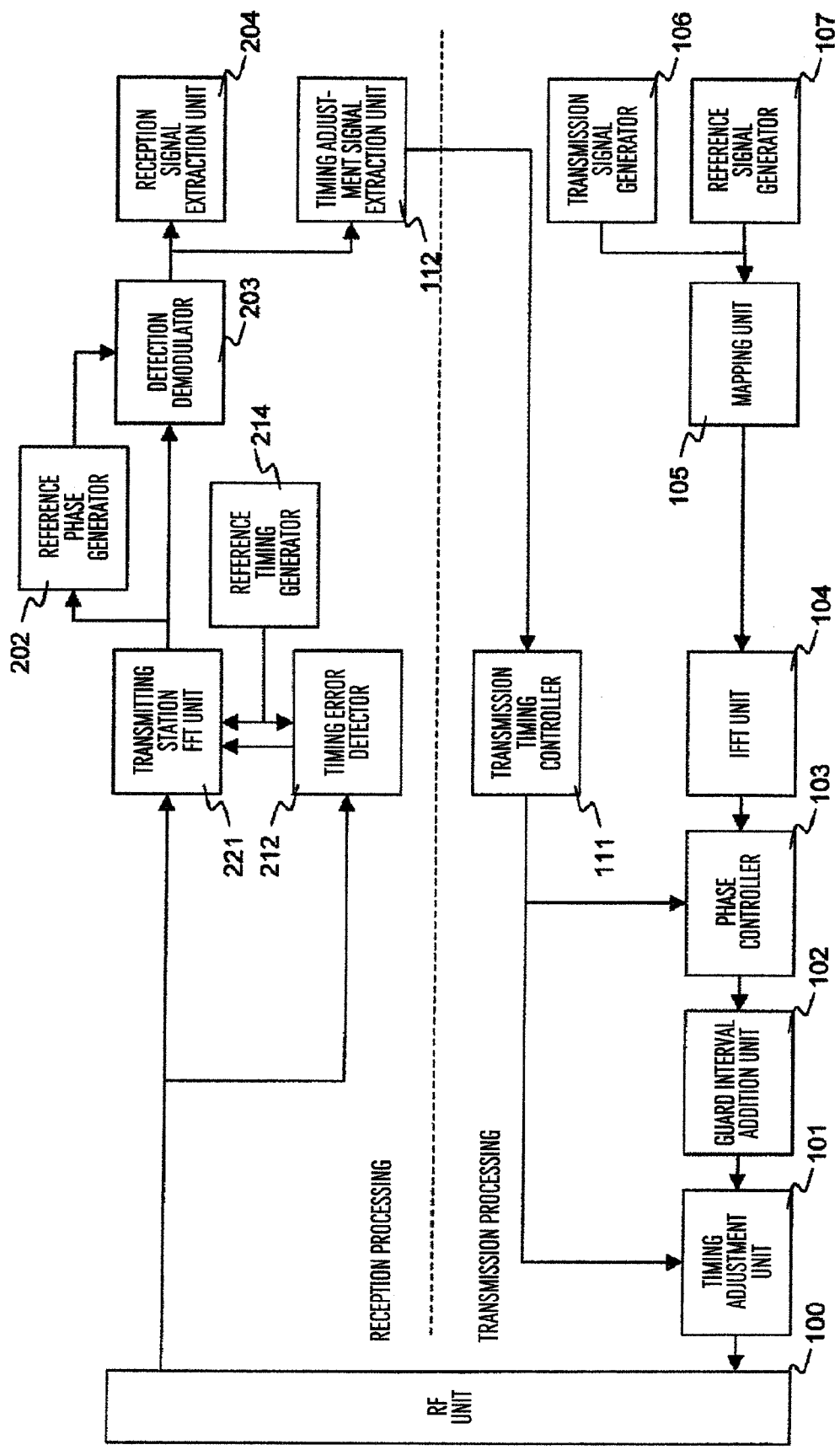
FIG. 20 is a configuration diagram illustrating the transmitting station according to the first embodiment of the present invention.

FIG. 20 is a configuration diagram of the transmitting station according to the first embodiment of the present invention. In the configuration diagram according to the present embodiment, an OFDM is used in a communication from the receiving station to the transmitting station similarly to that from the transmitting station to the receiving station. The timing adjustment processing of the present invention is not applied to the communication from the receiving station to the transmitting station.

A transmitting station RF unit 100 is used in place of a receiving station RF unit 200, and a transmitting station FFT unit 221 is used in place of an FFT unit 201. A timing error detector 212 supplies a signal not to a timing adjustment signal generator 213 but to the transmitting station FFT unit 221. A detection demodulator 203 supplies a signal to a timing adjustment signal extraction unit 112 in addition to a reception signal extraction unit 204. Through the exclusion of the above-mentioned facts, a reception processing from the transmitting station RF unit 100 to the reception signal extraction unit 204 is performed in the same manner as in the description of the after-mentioned receiving station.

The transmitting station FFT unit 221 performs an FFT operation in the range of FFT widows set based on a timing resulting from adding to a reference timing output from a reference timing generator 214 a difference between the reference timing and a reception timing detected by the timing error detector 212, and transfers FFT results to a reference phase generator 202 and a detection demodulator 203.

Figure 21:
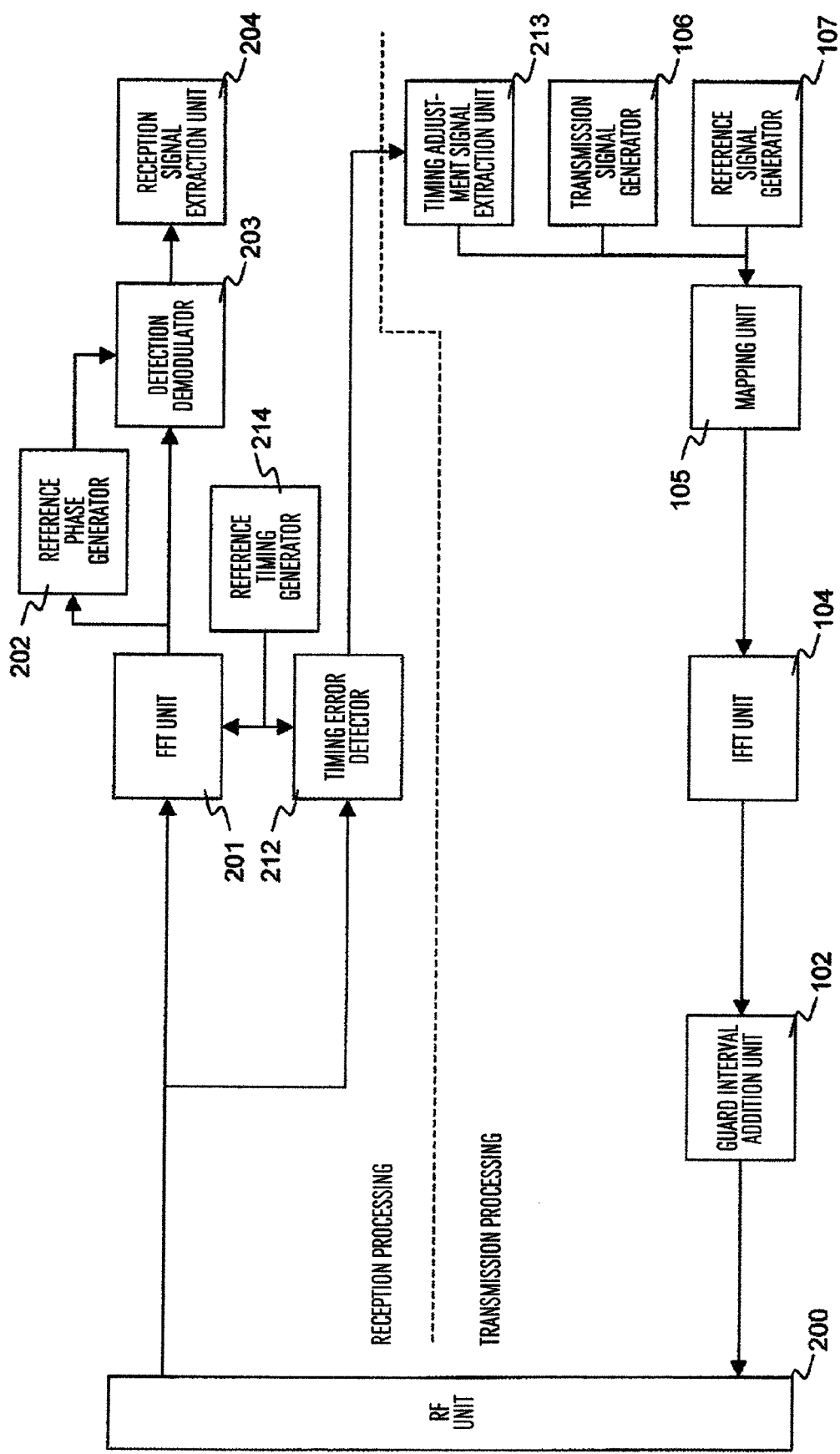
FIG. 21 is a configuration diagram illustrating the receiving station according to the first embodiment of the present invention.

FIG. 21 is a configuration diagram of the receiving station according to the first embodiment of the present invention. In the configuration diagram according to the present embodiment, the OFDM is used in a communication from the receiving station to the transmitting station similarly to that from the transmitting station to the receiving station. Further, the timing adjustment processing of the present invention is not applied to the communication from the receiving station to the transmitting station.

A transmission timing controller 111, a phase controller 103, and a timing adjustment unit 101 are absent, and the timing adjustment signal generator 213 supplies a timing adjustment signal to a mapping unit 105. Through the exclusion of the above-mentioned facts, the transmission processing is performed in the same manner as in the description of the after-mentioned transmitting station.

In FIG. 1, a configuration of the transmitting station illustrated in FIG. 20 and that of the receiving station illustrated in FIG. 21 are abstracted. A transmission processing from a transmission signal generator 106 of the transmitting station up to the transmitting station RF unit 100 and a reception processing from the receiving station RF unit 200 up to the reception signal extraction unit 204 and up to the timing adjustment signal generator 213 will be described in detail below.

The transmission signal generator 106 adds an error-correcting code and performs a symbol modulation with respect to information to be communicated from the transmitting station to the receiving station, thereby generating a transmission signal. Here, the error-correcting code means a code such as a reed solomon code, a convolution code, a turbo code, and an LDPC code, and is not particularly limited to the codes exemplified here. Further, the symbol modulation means BPSK, QPSK, 8 BPSK, 16 QAM, and 64 QAM, and is not particularly limited to the symbol modulation exemplified here.

Figure 12:
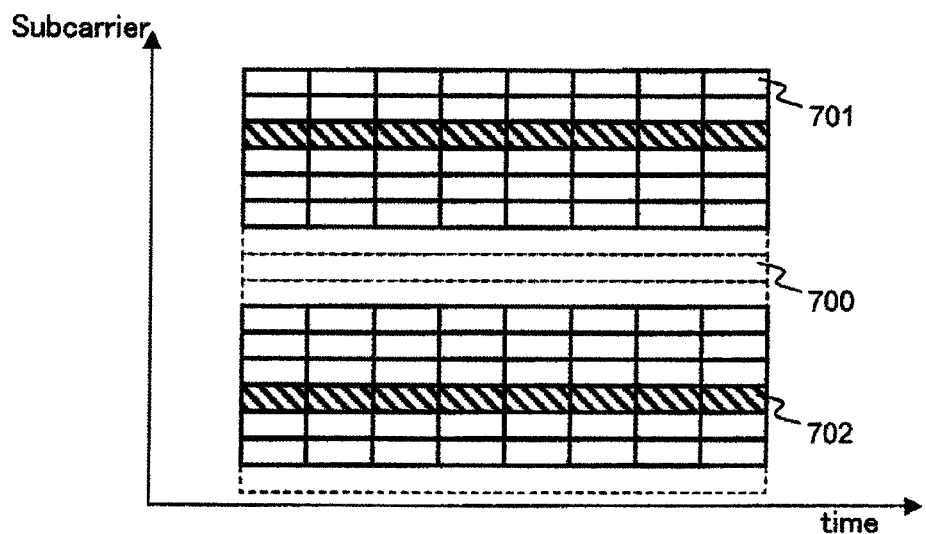
FIG. 12 illustrates a first example of mapping of a transmission signal and a reference signal.
Figure 13:
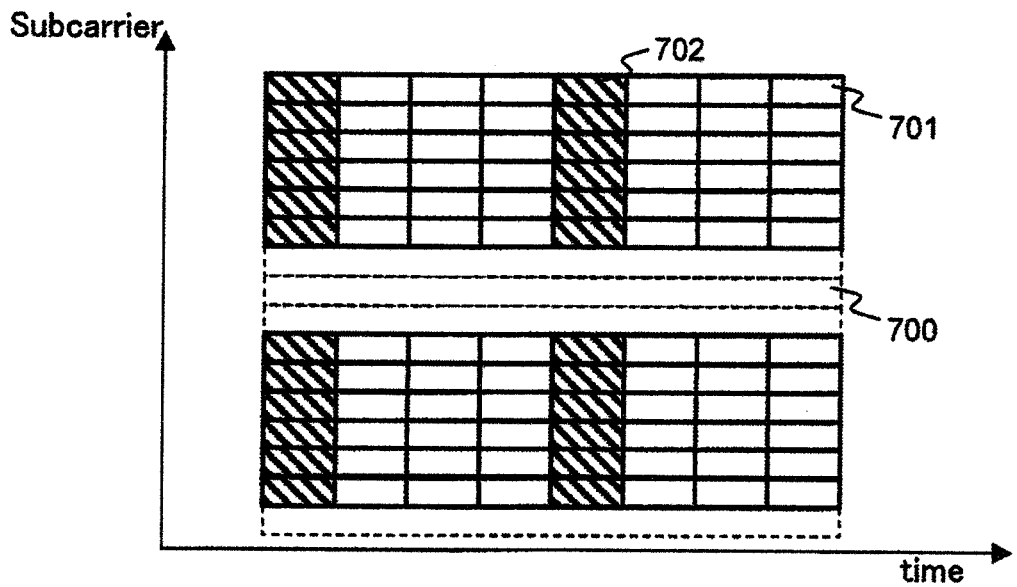
FIG. 13 illustrates a second example of mapping of a transmission signal and a reference signal.
Figure 14:
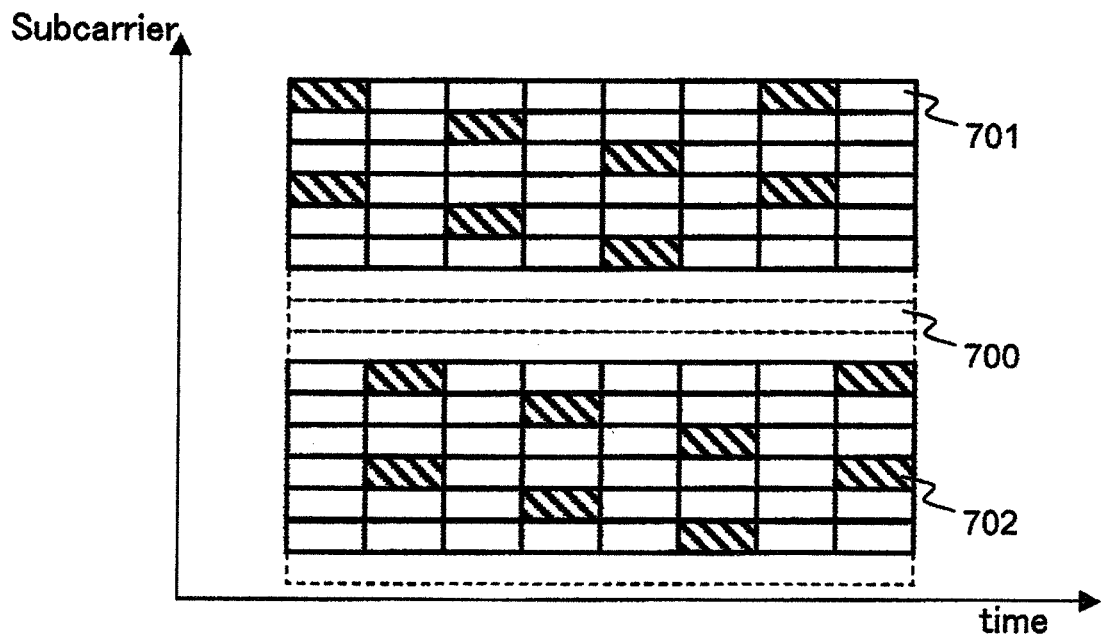
FIG. 14 illustrates a third example of mapping of a transmission signal and a reference signal.

The mapping unit 105 maps a transmission signal generated by the transmission signal generator 106 and a reference signal generated based on a predetermined pattern generated by a reference signal generator 107 on a time axis and a frequency axis. FIGS. 12, 13, and 14 each illustrate a first example of the mapping of a transmission signal and a reference signal. A domain surrounded by a broken line of 700 of drawings illustrates a subcarrier in which a signal is not mapped, a void rectangle of 701 illustrates a subcarrier in which a transmission signal is mapped, and a shaded rectangle of 702 illustrates a subcarrier in which a reference signal is mapped.

The mapping unit 105 can perform a mapping operation so as to concentrate reference signals on a specific subcarrier, for example, as in FIG. 12. The mapping unit 105 can perform a mapping operation so as to concentrate reference signals on a specific time, for example, as in FIG. 13. Further, the mapping unit 105 can also perform a mapping operation so as to scatter reference signals without concentrate them on a specific time and subcarrier, for example, as in FIG. 14. In addition, FIGS. 12, 13, and 14 each just illustrate one example, and further, patterns of the mapping and the number of the subcarriers are not limited to these examples. Or alternatively, the mapping unit 105 does not perform a mapping operation so as to scatter transmission signals and reference signals over a continuous time and the entire subcarrier, but can perform a mapping operation so as to concentrate them only on a part of a time and a part of a subcarrier.

The IFFT unit 104 subjects signals mapped on the time axis and the subcarrier axis by the mapping unit 105 to the IFFT operation, and converts the signals into the OFDM symbol in the time domain.

The phase controller 103 converts a signal arrangement of the OFDM symbol in the time domain output from the IFFT unit 104 using a signal arrangement phase notified by the transmission timing controller 111.

Figure 15:
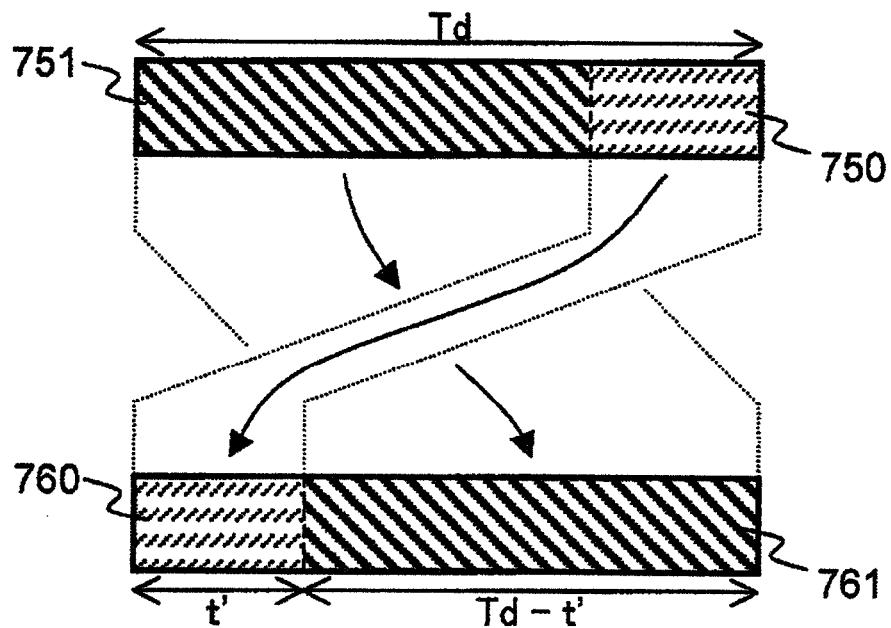
FIG. 15 is a schematic diagram illustrating a state of a conversion of a signal arrangement in a phase controller.

FIG. 15 is a schematic diagram illustrating a state of a conversion of the signal arrangement in the phase controller 103. The phase amount t'=t % Tg for use in the conversion is first computed using as t a signal phase notified by the transmission timing controller 111. When converting a signal arrangement using t', the phase controller 103 copies a signal with a length t' to a head 760 after the conversion from a tail of a signal in a domain 750 of FIG. 15 before the conversion. Further, the phase controller 103 copies a signal with a length Td−t' of the rest to a domain 761 after the conversion from a head of a signal in a domain 751 before the conversion.

A guard interval addition unit 102 adds a guard interval to a signal output from the phase controller 103 and sends out the signal to the timing adjustment unit 101.

The timing adjustment unit 101 adjusts the signal in accordance with a transmission timing notified by the transmission timing controller 111. Further, the transmitting station RF unit 100 converts the signal to a signal of radio frequency and transmits the signal to the receiving station.

In the receiving station, the receiving station RF unit 200 receives and samples the signal. Further, the receiving station RF unit 200 converts the signal to a baseband signal, and sends out the converted signal to the timing error detector 212 and the FFT unit 201.

The FFT unit 201 performs an FFT operation in the range of the FFT window set based on a reference timing output from the reference timing generator 214, and sends out FFT results to the reference phase generator 202 and the detection demodulator 203. Here, the reference timing is a timing signal as a basis of an operation periodically generated during an operation in the radio station for using the signal as a reference of an operation. The radio station drives each operation using, as a trigger, this reference timing or using, as a trigger, a timing obtained by adding an offset to this reference timing in order to perform a periodical operation.

The reference phase generator 202 compares a reception signal sent from the FFT unit 201 and a reference signal transmitted by the transmitting station, and generates reference phases as its ratio. Further, the reference phase generator 202 averages the generated reference phases, and further generates using an interpolation reference phases of the time and subcarrier at which signals except a signal with the reference phase are transmitted. The reference phase generator 202 sends this result to the detection demodulator 203, and the detection demodulator 203 performs a detection processing and demodulation processing using the reference phases and sends out the processed signals to the reception signal extraction unit 204.

The reception signal extraction unit 204 takes out a signal required from the signals output from the detection demodulator 203. Further, in the case where the transmission signal is subjected to the error-correcting code, the reception signal extraction unit 204 performs an error-correcting decoding and extracts the signal transmitted by the transmitting station.

Figure 16:
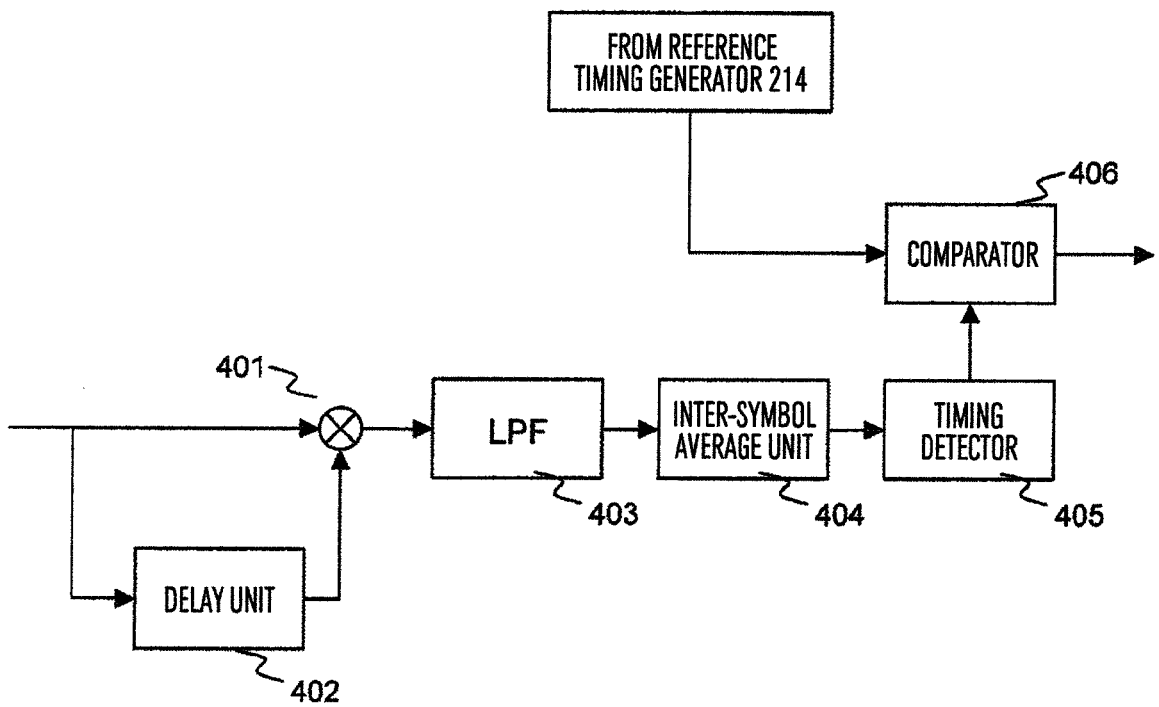
FIG. 16 is a configuration diagram of a timing error detector according to the first embodiment of the present invention.

FIG. 16 is a configuration diagram of the timing error detector 212. In the timing error detector 212, a signal produced from the RF unit 200 is supplied to a correlation operation unit 401 and a delay unit 402. The delay unit 402 delays an input signal having only a length Td of the OFDM symbol excluding the guard interval (GI), and outputs the delayed signal to the correlation operation unit 401. The correlation operation unit 401 performs a complex multiplication between one complex conjugate as an input signal to the timing error detector 212 and the other complex conjugate as an output signal from the delay unit 402, and supplies the results to an LPF 403.

The LPF 403 averages the signals using a low-pass filter and outputs the averaged signals. As the low-pass filter, for example, a moving average of the guard interval length Tg is used. An inter-symbol average unit 404 performs an electrification operation and an inter-symbol average processing with respect to the signals output from the LPF 403, and outputs the signals to the timing detector 405.

Here, the electrification operation is an operation for calculating a multiplication result between a complex signal and its own complex conjugate. Further, the inter-symbol average processing is a processing for averaging one signal at a certain timing within the OFDM symbol and another signal at a corresponding timing within the different OFDM symbol. For example, the inter-symbol average processing is a processing for performing an average between signals separated from each other by a length Ts of the OFDM symbol length including the guard interval (GI).

The timing detector 405 performs a processing for searching for a reception signal among output signals from the inter-symbol average unit 404 and, for example, detects as a reception timing a timing at which an output signal from the inter-symbol average unit 404 is maximized. A comparator 406 compares an output timing from the timing detector 405 as a reception timing with a reference timing produced from the reference timing generator 214, and supplied its difference to the timing adjustment signal generator 213.

The timing adjustment signal generator 213 notifies the transmitting station of the difference between the reception timing and the reference timing as described in the following process flow. In addition, as to a notification method from the timing adjustment signal generator 213 of the receiving station to the transmitting station, the timing adjustment signal generator 213 may notify the transmitting station of its difference using any notification method.

The timing adjustment signal extraction unit 112 of the transmitting station receives the difference data from the receiving station, and notifies the transmission timing controller 111 of the difference data.

The transmission timing controller 111 determines an initial transmission timing as a transmission timing at the time of starting communication and notifies the timing adjustment unit 101 of the initial transmission timing. Further, the transmission timing controller 111 determines an initial signal arrangement phase as a signal arrangement phase and notifies the phase controller 103 of the initial signal arrangement phase. Except for the start of communication, the transmission timing controller 111 uses the difference data notified by the timing adjustment signal extraction unit 112, updates the transmission timing and signal arrangement phase as described in the following process flow, transmits the updated transmission timing to the timing adjustment unit 101, and notifies the phase controller 103 of the updated signal arrangement phase.

Figure 11:
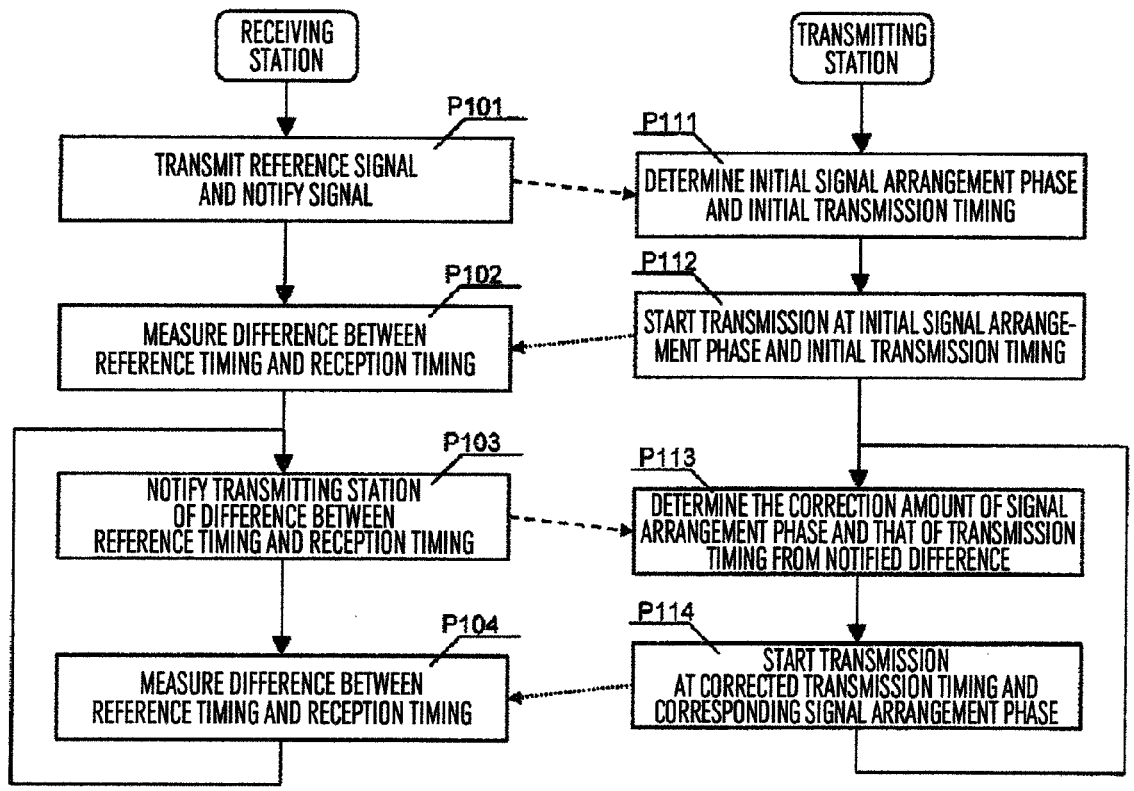
FIG. 11 is a schematic diagram illustrating a process flow between the transmitting station and the receiving station according to the first embodiment of the present invention.

FIG. 11 is a schematic diagram illustrating a process flow between the transmitting station and the receiving station according to the first embodiment.

In step P101, the receiving station first transmits a reference signal and a notify signal. Here, the reference signal indicates a predetermined fixed pattern signal as a system or a signal selected from a plurality of predetermined pattern signals. Further, the notify signal is a signal for notifying the transmitting station of conditions of the receiving station, and represents a state capable of reception using the reference signal.

In step P111, the transmitting station determines the initial signal arrangement phase and the initial transmission timing based on the reference signal and notify signal transmitted from the receiving station. Determination of the initial signal arrangement phase and the initial transmission timing in step P111 is performed by the transmission timing controller 111 of the transmitting station.

As a method for determining the initial transmission timing, for example, a characteristic timing extracted from the reference signal received by the transmitting station can be set to the initial transmission timing. Further, an initial transmission timing obtained by adding an offset to the characteristic timing extracted from the reference signal can be set to the initial transmission timing, and at this time, data on the received notify signal may be used for determining the offset. Or alternatively, a timing appropriately selected by the transmitting station itself can be set to the initial transmission timing without using the reference signal and the notify signal, and in this case, step P101 of the receiving station may be eliminated. Further, as the initial signal arrangement phase, zero may be selected most simply or another value may be selected.

Next, in step P112, the transmitting station starts to transmit a signal at the initial transmission timing determined in step P111. This step P112 can be performed by the timing adjustment unit 101 of the transmitting station.

In step P102, the receiving station measures a difference between a reference timing in the receiving station and a timing at which a signal transmitted by the transmitting station is received. Measurement of the difference in step P102 is performed by the timing error detector 212 of the receiving station.

In step P103, the receiving station notifies the transmitting station of the difference between the reference timing and reception timing measured in step P102. Generation of a signal for the difference in step P103 is performed by the timing adjustment signal generator 213 of the receiving station.

In step P113, the transmitting station determines the correction amount of the signal arrangement phase and that of the transmission timing based on the difference data notified by the receiving station. A signal of the difference data in step P113 is extracted by the timing adjustment signal extraction unit 112 of the transmitting station. Determination of the correction amount of the signal arrangement phase and that of the correction amount of the transmission timing in step P113 are performed by the transmission timing controller 111 of the transmitting station.

The correction amount determined by the transmitting station is used for the correction of the previously used signal arrangement phase and transmission timing. The correction of the signal arrangement phase is performed by the phase controller 103, and the signal arrangement phase that is used for the previous signal transmission is corrected and the signal arrangement phase is determined according to the correction amount. The correction of the transmission timing is performed by the timing adjustment unit 101, and the transmission timing that is used for the previous signal transmission is corrected and a new transmission timing is determined according to the correction amount.

In step P114, the transmitting station transmits a signal at the determined signal arrangement phase and transmission timing, and performs a repetition processing for returning to step P113 if notified by the receiving station again. This step P114 is performed by the timing adjustment unit 101 of the transmitting station.

In step P104, the receiving station measures the difference between the reference timing and the reception timing similarly to step P102. Further, the receiving station repeatedly performs a processing for returning to step P103 and notifying the transmitting station of the difference data. Measurement of the difference in step P104 is performed by the timing error detector 212 of the receiving station.

As to the difference between the reference timing and the reception timing in the above-described processing, the receiving station may notify the transmitting station of: the difference itself; values obtained by quantizing the difference into several stages; whether an absolute value of the difference is less than or equal to a threshold, an absolute value of the difference is more than or equal to a threshold and positive, or an absolute value of the difference is more than or equal to a threshold and negative; or whether the difference is positive or negative.

In addition, the fact that the difference between the reference timing and the reception timing is positive means that the reception timing is delayed as compared with the reference timing. On the other hand, the fact that the difference between the reference timing and the reception timing is negative means that the reception timing is advanced as compared with the reference timing.

Further, the correction amount of the transmission timing to be determined in step P113 may be equal to the difference between the notified reference timing and reception timing, it may be the value obtained by quantizing the notified difference into several stages, or it may be the value selected fixedly based on the fact that the notified difference is positive or negative. Also in any of the above-described cases, if an absolute value of the difference is less than or equal to a threshold, the correction amount can be set to zero. In addition, the fact that the correction amount is positive means that the transmission timing is advanced. On the other hand, the fact that the correction amount is negative means that the transmission timing is delayed.

Figure 5:
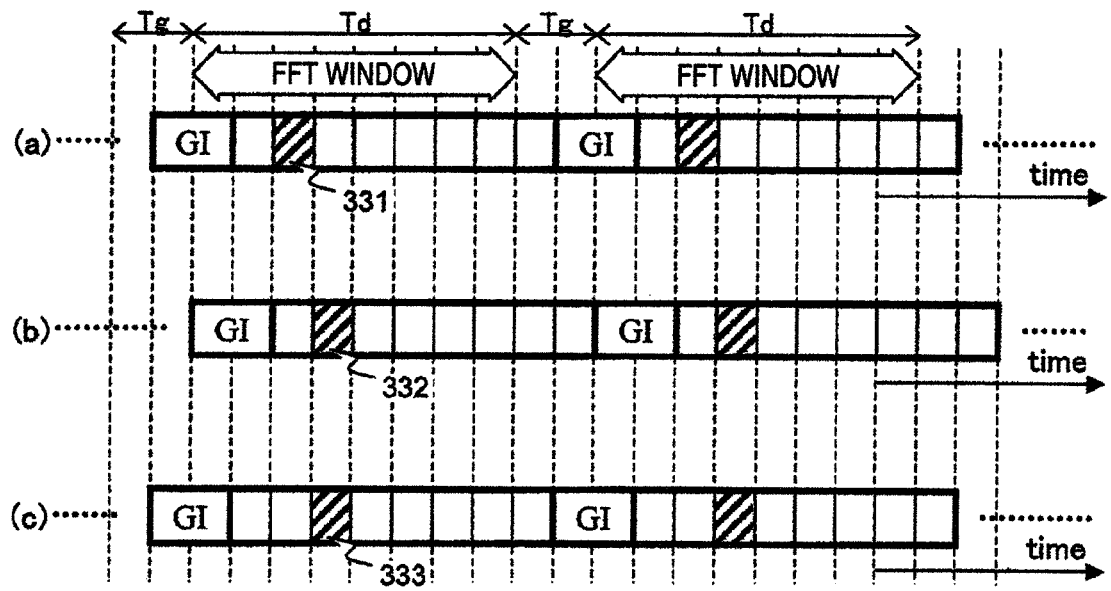
FIG. 5 is a schematic diagram illustrating a state of a receiving station reception signal at the time when a transmission timing is advanced by the timing adjustment processing of the present invention.

For example, FIG. 5 is a schematic diagram illustrating a state of the receiving station reception signal at the time of "advancing the transmission timing" by the timing adjustment processing of the present invention. FIG. 5A illustrates an example of the reception signal of the reception timing as a reference, and a shaded block 331 is located at a second unit from the head of the OFDM symbol excluding the guard interval (GI). Further, the FFT window includes the guard interval by one unit, and the shaded block 331 is located at a third unit from the head within the FFT window.

In FIG. 5, the OFDM symbol is divided into eight units, and a description will be made based on these divided units. The division of the eight units does not mean that the number of units of the FFT and the IFFT is always eight, and is adopted for the purpose of simplifying an explanation of FIG. 5. In the present invention, the number of units of the FFT and the IFFT is not restrained. In FIG. 5, the number of units of the guard interval (GI) is two, and also the number of units of the guard interval is not restrained in the same manner. The guard interval may have any number of units.

FIG. 5B illustrates an example of a reception signal in which a timing relative to the FFT window is delayed more than that of FIG. 5A due to a change in a distance between the transmitting station and the receiving station, a change in a propagation environment such as a reflected wave, and a deviation of clocks between the transmitting station and the receiving station. A shaded block 332 is located at a second unit from the head of the OFDM symbol excluding the guard interval (GI) similarly to the block 331 of FIG. 5A. On the other hand, the shaded block 332 is located at a fourth unit from the head of the FFT window due to the fact that the entire signal is delayed more than that of FIG. 5 by one unit.

The reception timing of FIG. 5B is delayed more than that of FIG. 5A as a reference by one unit, and therefore the receiving station instructs the transmitting station to advance a transmission timing by one unit by performing the timing adjustment processing. Here, an instruction of advancing one unit is allowed to correspond to the delay of one unit; however, the amount of delay of a signal detected by the receiving station is not necessarily matched with the amount for instructing the transmitting station to advance the transmission timing.

FIG. 5C illustrates an example of a reception signal in which the transmission timing is advanced by subjecting the delayed signal of FIG. 5B to the timing adjustment processing. By the phase control processing through the transmitting station, a shaded block 333 is moved from the block 332 of FIG. 5B before the timing adjustment processing and is located at a third unit from the head of the OFDM symbol excluding the guard interval (GI). The above-described block 333 is located at a fourth unit from the head of the FFT window, and the position from the head of the FFT window is the same as that of the block 332 of FIG. 5B before the timing adjustment processing. As a result, in relation to the signal phase after the FFT operation in the receiving station, discontinuity due to the timing adjustment processing is eliminated.

Figure 6:
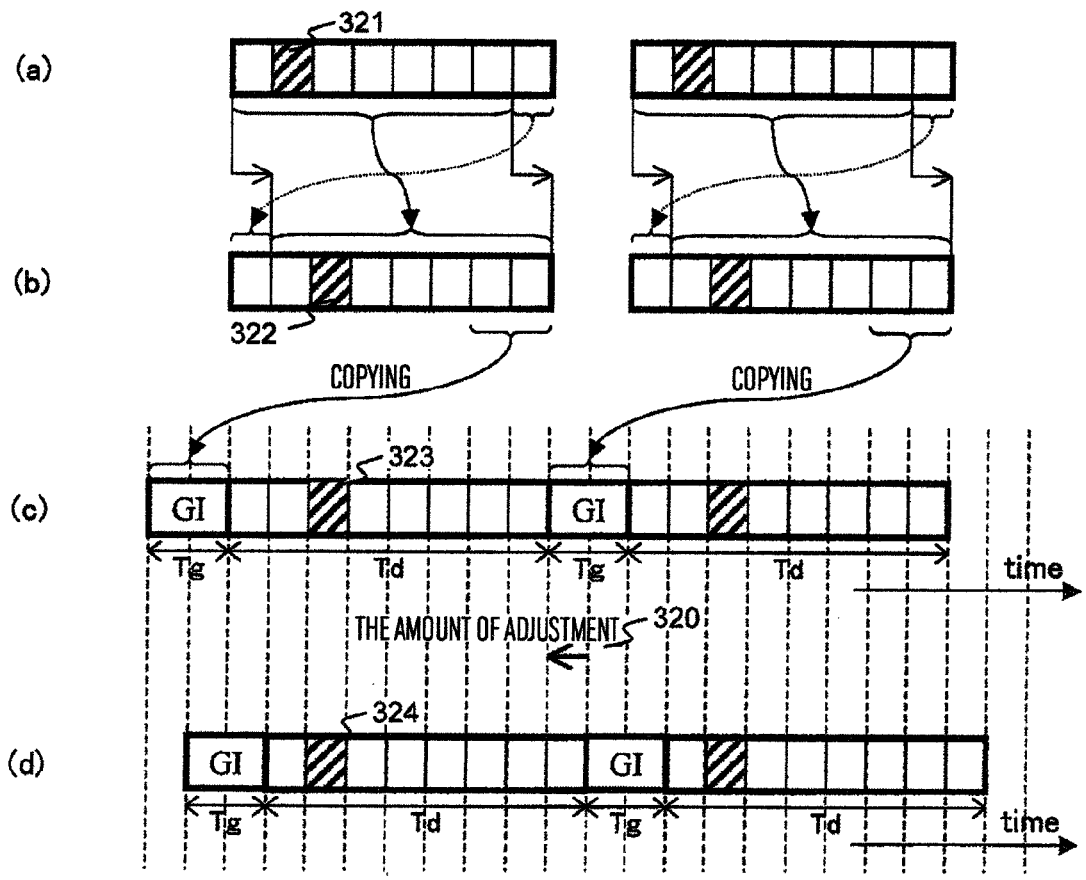
FIG. 6 is a schematic diagram illustrating a state of a transmitting station transmission signal at the time when a transmission timing is advanced by the timing adjustment processing of the present invention.

FIG. 6 is a schematic diagram illustrating a state of the transmitting station transmission signal at the time of "advancing the transmission timing" by the timing adjustment processing of the present invention.

FIG. 6A illustrates an example of a signal generated by the IFFT operation in the transmitting station. FIG. 6D illustrates an example of a transmission signal before receiving the timing adjustment instruction, and the guard interval (GI) of a signal of FIG. 6A is added thereto for transmission. When receiving an instruction of advancing the transmission timing from the receiving station, the transmitting station performs the phase control processing for changing the signal arrangement according to the amount of timing adjustment 320.

In the phase control processing, the amount of timing adjustment 320 represents an instruction for advancing the transmission timing by one unit and therefore, a signal generated by the IFFT is displaced backward by one unit and a signal of one unit of the tail is added to the head to thereby generate a signal of FIG. 6B. A transmission signal generated by adding the guard interval of the signal of FIG. 6B thereto is a signal illustrated in FIG. 6C. This signal is transmitted to the receiving station, and received by the receiving station as a signal after the timing adjustment processing of FIG. 5C.

Figure 7:
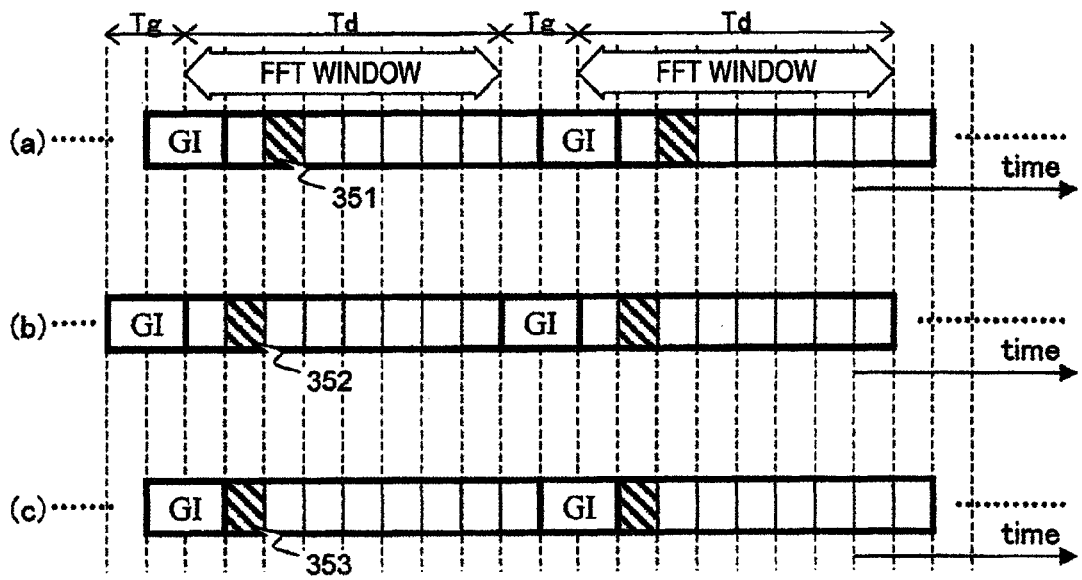
FIG. 7 is a schematic diagram illustrating a state of the receiving station reception signal at the time when a transmission timing is delayed by the timing adjustment processing of the present invention.

Next, FIG. 7 is a schematic diagram illustrating a state of a receiving station reception signal at the time of "delaying the transmission timing" by the timing adjustment processing of the present invention. FIG. 7A illustrates an example of a reception signal at a reception timing as a reference, and a shaded block 351 is located at a second unit from the head of the OFDM symbol excluding the guard interval (GI). Further, the FFT window is covered with the guard interval by one unit and the shaded block 351 is located at a third unit from the head of the FFT window.

FIG. 7B illustrates an example of a reception signal in which a timing relative to the FFT window is advanced more than that of FIG. 7A due to a change in a distance between the transmitting station and the receiving station, a change in a propagation environment such as a reflected wave, and a deviation of clocks between the transmitting station and the receiving station. A shaded block 352 is located at a second unit from the head of the OFDM symbol excluding the guard interval (GI) similarly to the block 351 of FIG. 7A. On the other hand, the shaded block 352 is located at a second unit from the head of the FFT window due to the fact that the entire signal is advanced more than that of FIG. 7A by one unit.

Since the reception timing of FIG. 7B is advanced more than that of FIG. 7A as a reference by one unit, the receiving station instructs the transmitting station to delay the transmission timing by one unit by performing the timing adjustment processing. Here, an instruction of delaying one unit is allowed to correspond to the advance of one unit; however, the amount of advance of a signal detected by the receiving station is not necessarily matched with the amount of instructing the transmitting station to delay the transmission timing.

FIG. 7C illustrates an example of the reception signal where an advanced signal of FIG. 7B is subjected to the timing adjustment processing and the transmission timing is delayed. By the phase control processing through the transmitting station, the shaded block 353 is moved from the block 352 of FIG. 7B before the timing adjustment processing and is located at the first unit from the head of the OFDM symbol excluding the guard interval (GI). The above-described block 353 is located at the second unit from the head of the FFT window, and the position from the head of the FFT window is the same as that of the block 352 of FIG. 7B before the timing adjustment processing. As a result, in relation to the signal phase after the FFT operation in the receiving station, discontinuity due to the timing adjustment processing is eliminated.

Figure 8:
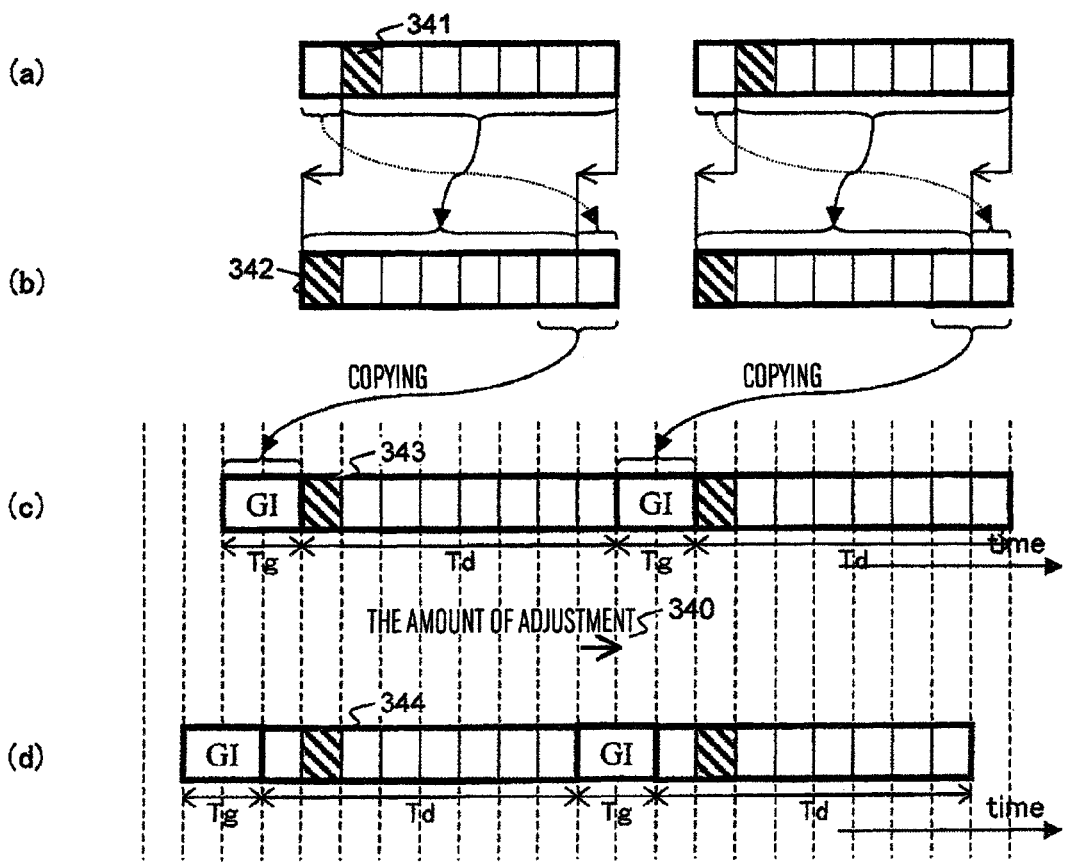
FIG. 8 is a schematic diagram illustrating a state of the transmitting station transmission signal at the time when a transmission timing is delayed by the timing adjustment processing of the present invention.

FIG. 8 is schematic diagram illustrating a state of the transmitting station transmission signal at the time of "delaying the transmission timing" by the timing adjustment processing of the present invention.

FIG. 8A illustrates an example of a signal generated by the IFFT operation in the transmitting station. FIG. 8D illustrates an example of the transmission signal before receiving a timing adjustment instruction, and the guard interval (GI) of the signal of FIG. 8A is added thereto for transmission. When receiving an instruction of delaying the transmission timing from the receiving station, the transmitting station performs the phase control processing for changing a signal arrangement according to the amount of timing adjustment 340. In the phase control processing, since the receiving station instructs the transmitting station to delay the amount of timing adjustment 340 by one unit, the transmitting station displaces the signal generated by the IFFT forward by one unit and moves the signal of one unit of the head to the tail, thus generating the signal of FIG. 8B. FIG. 8C illustrates a transmission signal generated by adding the guard interval (GI) of the signal of FIG. 8B. This signal is transmitted to the receiving station and received by the receiving station as the signal of FIG. 7C after the timing adjustment processing.

Figure 9:
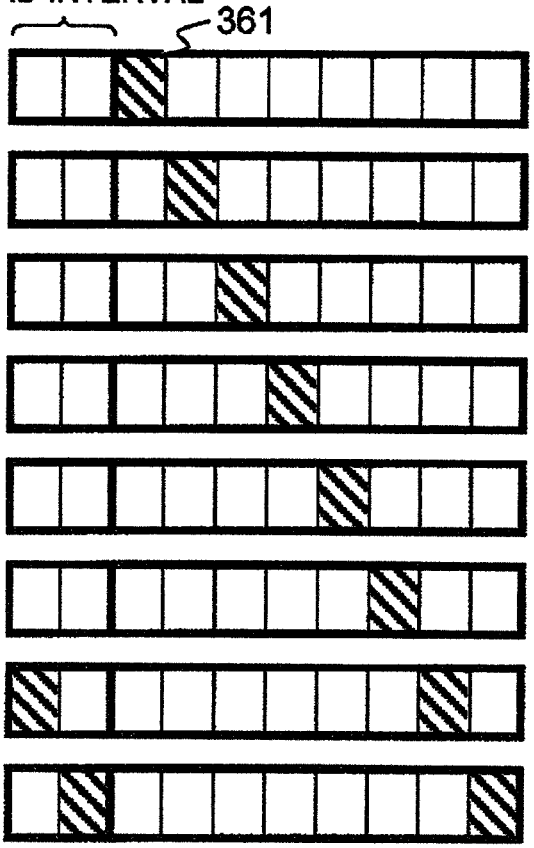
FIG. 9 illustrates an example of a signal in which a signal arrangement is changed by a phase control processing of the present invention.
Figure 10:
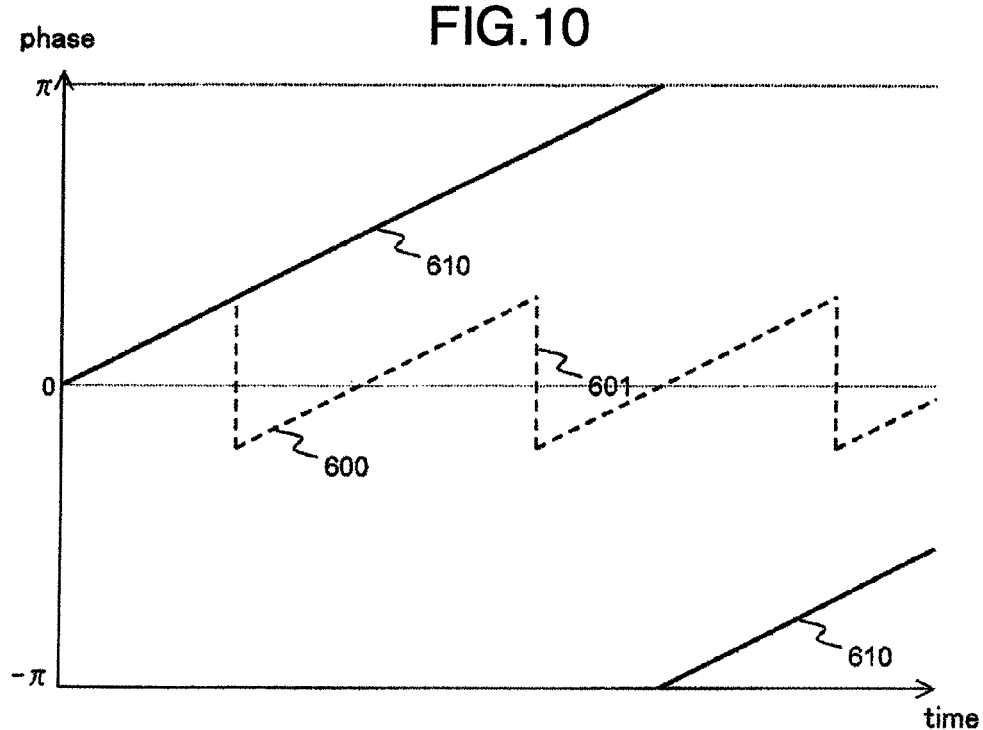
FIG. 10 is a graph illustrating an effect of the present invention.

In a change in a signal arrangement using the above-described phase control processing, only a change in one unit from the signal before the timing adjustment processing is described. Further, a change in any number of units can also be really performed. FIG. 9 illustrates an example of a signal in which the signal arrangement is changed by the phase control processing.

For example, a signal before the timing adjustment processing, namely, a signal at the time when the phase control processing is not performed is set to a signal of FIG. 9A. A signal is displaced backward by one unit using the phase control processing corresponding to the fact that the transmission timing is quickened by one unit using the timing adjustment processing. In the above-described case, when a signal is returned to an initial state whenever the adjustment amount of the timing adjustment processing reaches a length of the OFDM symbol excluding the guard interval (GI) as in FIG. 9A to FIG. 9B to FIG. 9C to . . . FIG. 9G to FIG. 9H to FIG. 9A to . . . , any number of units can also be changed. In general, with respect to zero or a positive or negative integer m as illustrated in FIG. 9, any one of the signals of (a) to (h) is selected according to a sum of the amount of timing adjustment. This processing permits the present invention to be applied also to any amount of the timing adjustment.

Second Embodiment

The timing adjustment processing and the radio station according to a second embodiment of the present invention will be described with reference to the accompanying drawings. In addition, a process flow between the transmitting station and the receiving station is common to that of the first embodiment.

Figure 17:
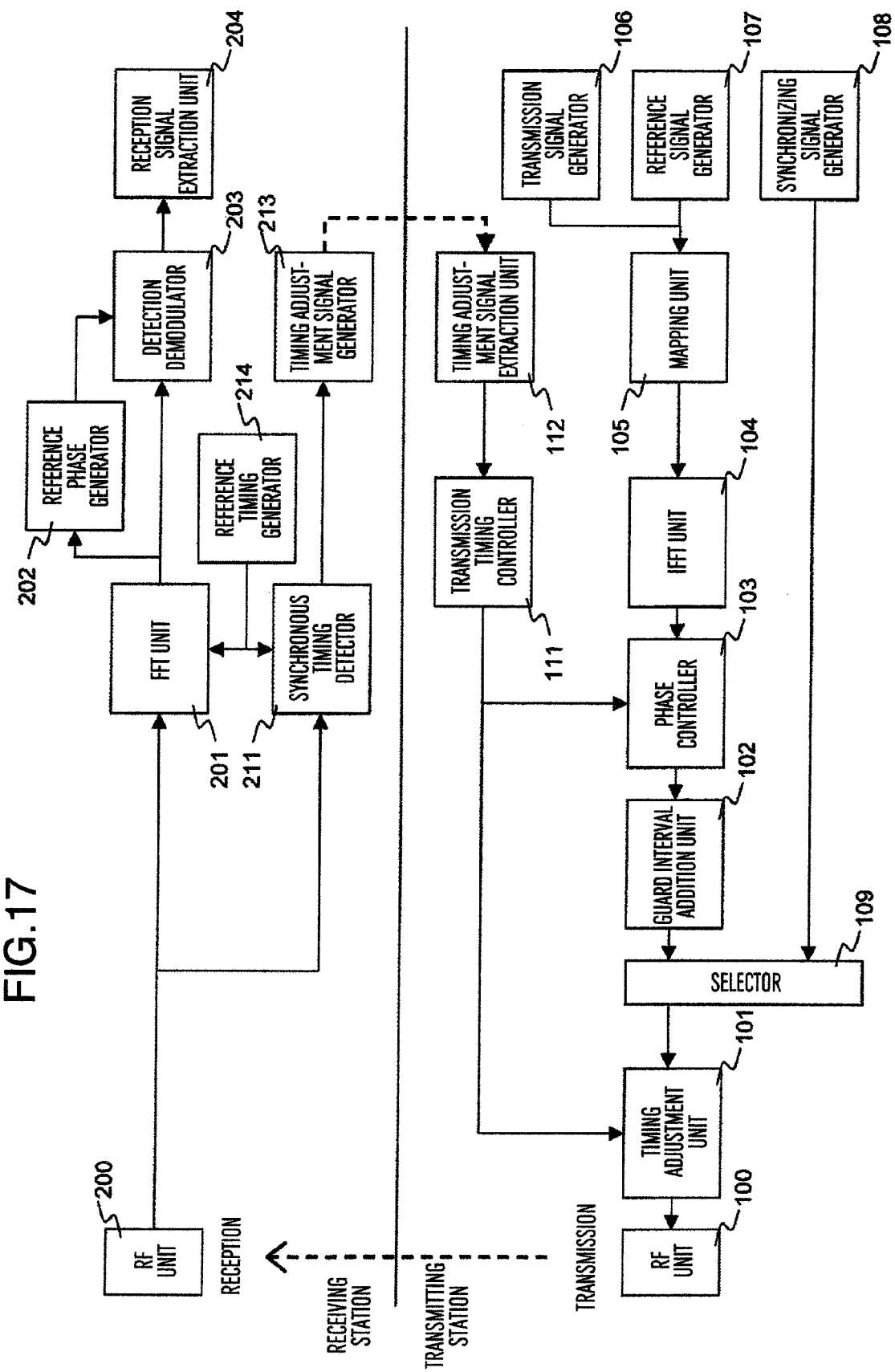
FIG. 17 is a configuration diagram of the transmitting station and the receiving station according to a second embodiment of the present invention.

FIG. 17 is a configuration diagram of the transmitting station and the receiving station according to the second embodiment of the present invention.

According to the second embodiment of the present invention, the transmitting station RF unit 100, timing adjustment unit 101, guard interval addition unit 102, phase controller 103, IFFT unit 104, mapping unit 105, transmission signal generator 106, reference signal generator 107, transmission timing controller 111, and timing adjustment signal extraction unit 112 of the transmitting station are the same as those of the first embodiment.

In the transmitting station according to the second embodiment of the present invention, the guard interval addition unit 102 supplies a signal to a selector 109 before supplying the signal to the timing adjustment unit 101. The selector 109 time-multiplexes a signal output from the guard interval addition unit 102 and a predetermined signal generated by the synchronizing signal generator 108.

Figure 18:
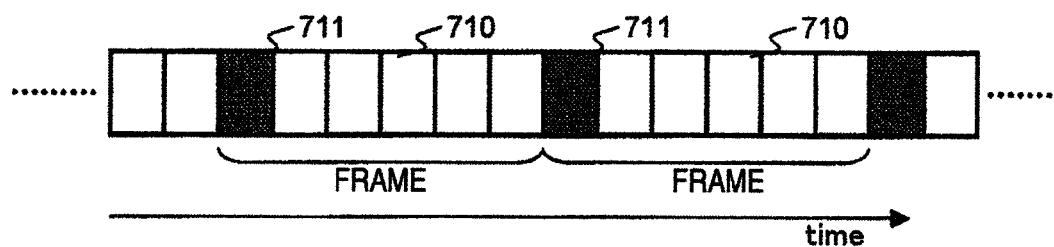
FIG. 18 is a schematic diagram illustrating a state of a time multiplexing of a selector 109.

FIG. 18 is a schematic diagram illustrating a state of the time multiplexing of the selector 109. A void block 710 illustrates the OFDM symbol in which the transmission signal and the reference signal are mapped, and a shaded block 711 illustrates a synchronizing signal 711. In addition, a length of the synchronizing signal 711 may be matched with the OFDM symbol length Ts to which the guard interval length is added, or may fail to be matched with the OFDM symbol length Ts. Further, the synchronizing signal 711 may be inserted into any portion. For example, a unit resulting from combining a plurality of OFDM symbols is here referred to as a frame, and one or a plurality of synchronizing signals can be inserted into a frame unit.

According to the second embodiment of the present invention, the receiving station RF unit 200, FFT unit 201, reference phase generator 202, detection demodulator 203, reception signal extraction unit 204, timing adjustment signal generator 213, and reference timing generator 214 of the receiving station are the same as those of the first embodiment.

Figure 19:
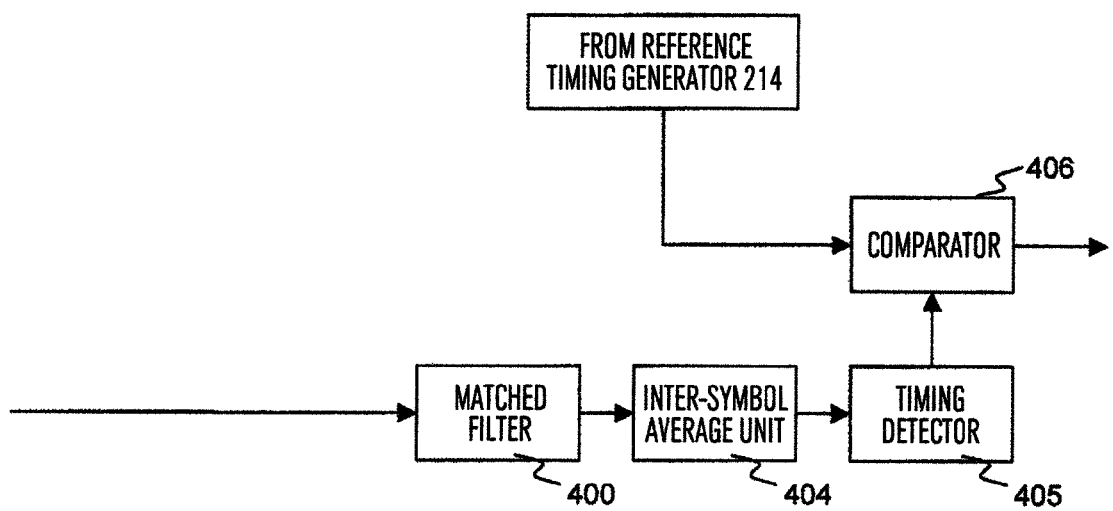
FIG. 19 is a configuration diagram illustrating a synchronous timing detector according to the second embodiment of the present invention.

A synchronous timing detector 211 according to the second embodiment of the present invention is configured, for example, as illustrated in FIG. 19. A signal supplied to the synchronous timing detector 211 first reaches a matched filter 400. The matched filter 400 uses a complex conjugate signal of the synchronizing signal used in the transmitting station as a filter coefficient, and supplies a filter output to the inter-symbol average unit 404. The inter-symbol average unit 404 performs an electrification operation and an inter-symbol average processing with respect to the signal, and then supplies the signal to the timing detector 405.

Here, the electrification operation is an operation for calculating a multiplication result between a complex signal and its own complex conjugate. Further, the inter-symbol average processing is a processing for averaging one signal at a timing within the OFDM symbol and another signal at a corresponding timing within the different OFDM symbol. The synchronous timing detector 211 performs an averaging between signals separated from each other by a distance between one synchronizing signal and another synchronizing signal. When the synchronizing signals in the transmitting station are multiplexed, for example, as illustrated in FIG. 18, the multiplexing processing is a processing for performing an averaging between signals separated from each other by a time equivalent to a frame time.

The timing detector 405 performs processing for searching for a reception signal among signals from the inter-symbol average unit 404, and detects as the reception timing, for example, a timing in which an output from the inter-symbol average unit 404 is maximized. A comparator 406 compares an output timing as the reception timing from the timing detector 405 and a reference timing produced from the reference timing generator 214, and outputs its difference to the timing adjustment signal generator. 213.

Figure 22:
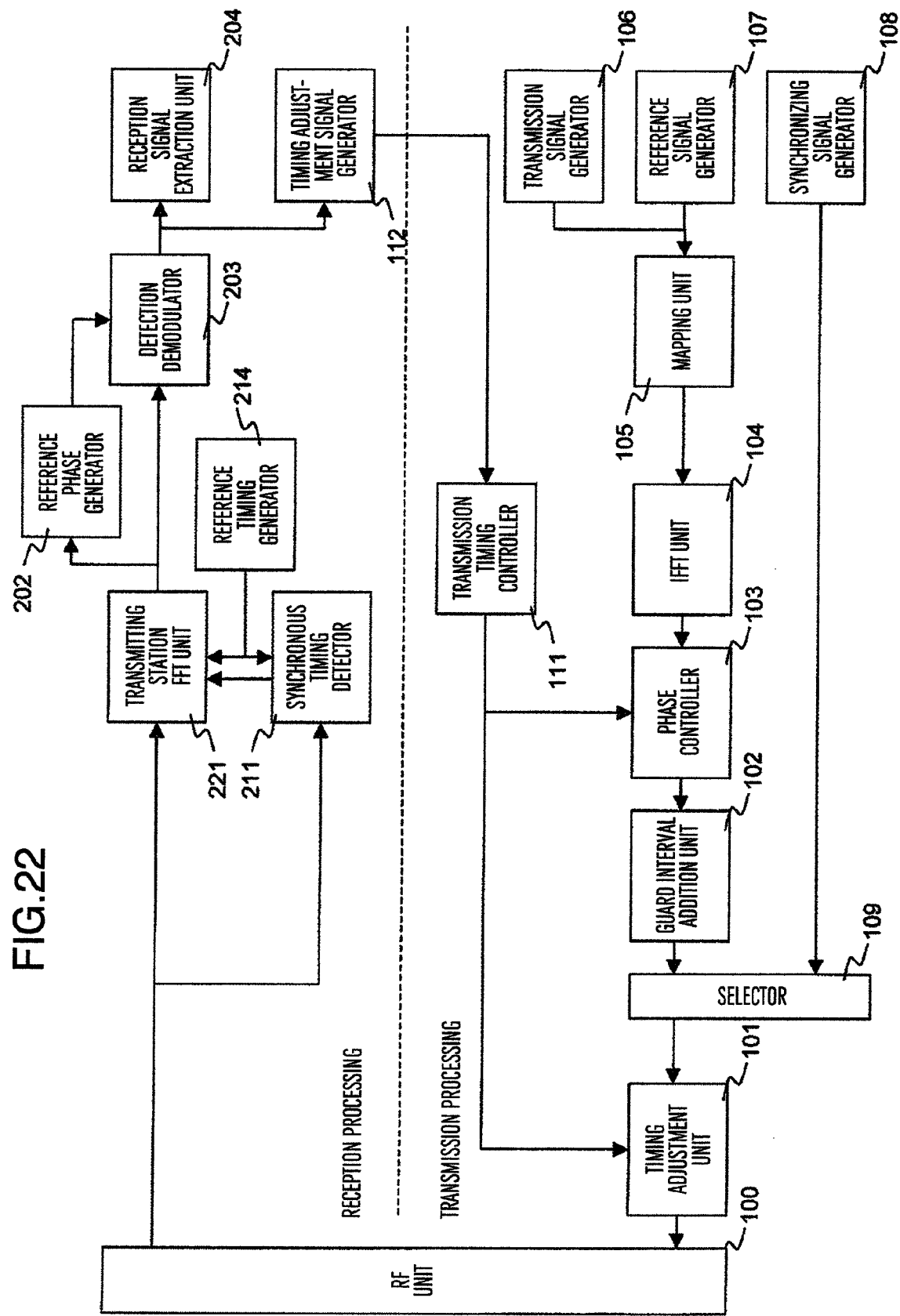
FIG. 22 is a configuration diagram illustrating the transmitting station according to the second embodiment of the present invention.

FIG. 22 is a configuration diagram of the transmitting station according to the second embodiment of the present invention. In the configuration diagram according to the second embodiment, the OFDM is used in a communication between the receiving station and the transmitting station similarly to that between the transmitting station and the receiving station. The timing adjustment processing of the present invention is not applied to the communication between the receiving station and the transmitting station.

The transmission processing from the transmission signal generator 106 up to the transmitting station RF unit 100 is as described in the transmitting station.

The reception processing from the transmitting station RF unit 100 up to the reception signal extraction unit 204 is the same as that of the transmitting station according to the first embodiment with the exception of using the synchronous timing detector 211 in place of the timing error detector 212.

Figure 23:
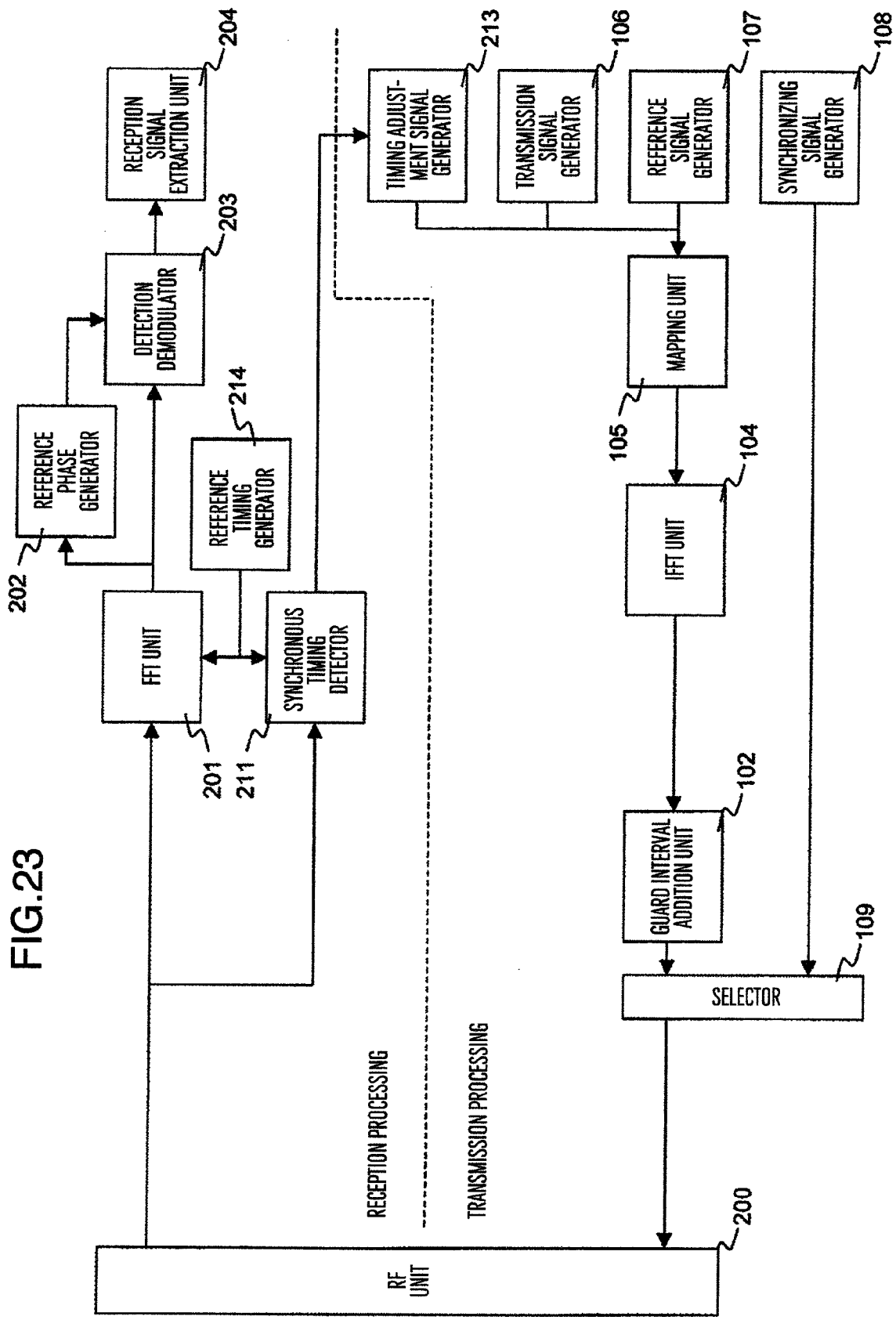
FIG. 23 is a configuration diagram illustrating the receiving station according to the second embodiment of the present invention.

FIG. 23 is a configuration diagram of the receiving station according to the second embodiment of the present invention. In the configuration diagram according to the second embodiment, the OFDM is used in a communication between the receiving station and the transmitting station similarly to that between the transmitting station and the receiving station. The timing adjustment processing of the present invention is not applied to the communication between the receiving station and the transmitting station.

The reception processings from the receiving station RF unit 200 up to the reception signal extraction unit 204 and up to the timing adjustment signal generator 213 are as described in the receiving station.

In the transmission processing, the receiving station performs the same processing as described in the transmitting station with the exception of the fact that the transmission timing controller 111, the phase controller 103, and the timing adjustment unit 101 are absent and the timing adjustment signal generator 213 supplies the timing adjustment signal to the mapping unit 105.

It should be further understood by those skilled in the art that although the foregoing description has been made on embodiments of the invention, the invention is not limited thereto and various changes and modification may be made without departing from the spirit of the invention and the scope of the appended claims.

INDUSTRIAL APPLICABILITY

The timing adjustment method of the present invention can be applied to the wireless communication system, and the radio station of the present invention can be applied to the base station or mobile terminal of the wireless communication system.

The invention claimed is:

1. A wireless communication system wherein signals are transmitted and received between a first radio station and a second radio station, comprising:
   the first radio station including:
   a measurer that measures a difference between a reference timing of the first radio station and a reception timing of a signal transmitted from the second radio station;
   a timing adjustment signal generator that generates a first signal including data on the difference; and
   a transmitter that transmits the first signal including the data on the difference; and
   the second radio station including:
   a signal generator that generates a second signal in a time domain using an orthogonal transformation;
   a timing adjustment signal extractor that extracts the data on the difference included in the first signal transmitted from the first radio station, as extracted difference data;
   a transmission timing controller that determines a correction amount of a signal arrangement phase and that of a transmission timing based on the extracted difference data;
   a phase controller that controls the signal arrangement phase of the second signal in the time domain based on the correction amount of the signal arrangement phase; and
   a timing adjustor that controls the transmission timing of the second signal in which the signal arrangement phase is controlled based on the correction amount of the transmission timing, and
   wherein using the controlled transmission timing, the second radio station transmits the second signal to the first radio station.

2. The wireless communication system according to claim 1,
   wherein the signal generator is an IFFT signal generator using a discrete Fourier transformation as the orthogonal transformation.

3. The wireless communication system according to claim 1,
   wherein the second radio station further includes a guard interval adder that adds a guard interval to the second signal in which the signal arrangement phase is controlled; and
   wherein the timing adjustor controls a transmission timing of the second signal to which the guard interval is added.

4. The wireless communication system according to claim 1, wherein the correction amount of the signal arrangement phase is equal to that of the transmission timing.

5. The wireless communication system according to claim 1,
wherein the first radio station transmits to the second radio station a signal with a known pattern in which an orthogonal transformation and a change in a signal sequence are not performed.

6. The wireless communication system according to claim 1,
wherein the measurer that measures the difference is a timing error detector, the timing error detector including:
a delayer that delays an input signal;
a correlation operator that performs complex multiplication between a conjugate of either the input signal or a signal output from the delayer and another signal;
an LPF that averages signals output from the correlation operator;
an inter-symbol averager that calculates power of output signals from the LPF and performs an inter-symbol average processing;
a timing detector that detects a desired reception timing from signals output from the inter-symbol averager; and
a comparator that compares an output timing from the timing detector and the reference timing, and
wherein the timing error detector outputs the comparison results as the difference to the timing adjustment signal generator.

7. The wireless communication system according to claim 1,
wherein the measurer that measures the difference is a timing synchronization detector, the timing synchronization detector including:
a matched filter;
an inter-symbol averager that calculates power of output signals from the matched filter and performs an inter-symbol average processing;
a timing detector that detects a desired reception timing from signals output from the inter-symbol averager; and
a comparator that compares an output timing from the timing detector and the reference timing; and
wherein the timing synchronization detector outputs the comparison results as the difference to the timing adjustment signal generator.

8. A method for adjusting a timing for synchronizing a reception signal in a wireless communication system for transmitting and receiving signals between a first radio station and a second radio station, the method causing: the first radio station to execute operations comprising:
measuring a difference between a reference timing of the first radio station and a reception timing of a signal transmitted from the second radio station;
generating a first signal including difference data conveying the difference; and
transmitting the first signal including the difference data, and
the second radio station to execute operations comprising:
generating a second signal in a time domain using an orthogonal transformation;
extracting the difference data included in the first signal transmitted from the first radio station, as extracted difference data;
determining a correction amount of a signal arrangement phase and that of a transmission timing, based on the extracted difference data;
controlling the signal arrangement phase of the second signal in the time domain, based on the correction amount of the signal arrangement phase; and
controlling the transmission timing of the second signal in which the signal arrangement phase is controlled, based on the correction amount of the transmission timing;
wherein using the controlled transmission timing, the second radio station transmits the second signal to the first radio station.

* * * * *